United States Patent
Tetsuka et al.

(10) Patent No.: US 11,440,611 B2
(45) Date of Patent: Sep. 13, 2022

(54) OPERATING APPARATUS FOR HUMAN-POWERED VEHICLE

(71) Applicant: SHIMANO INC., Sakai (JP)

(72) Inventors: Toshio Tetsuka, Sakai (JP); Taihei Nishihara, Sakai (JP)

(73) Assignee: SHIMANO INC., Sakai (JP)

( * ) Notice: Subject to any disclaimer, the term of this patent is extended or adjusted under 35 U.S.C. 154(b) by 369 days.

(21) Appl. No.: 16/525,515

(22) Filed: Jul. 29, 2019

(65) Prior Publication Data
US 2021/0031865 A1 Feb. 4, 2021

(51) Int. Cl.
| | |
|---|---|
| B62K 23/02 | (2006.01) |
| B62L 3/02 | (2006.01) |
| B62M 25/08 | (2006.01) |
| B62J 45/00 | (2020.01) |
| B62J 99/00 | (2020.01) |

(52) U.S. Cl.
CPC ............... B62K 23/02 (2013.01); B62J 99/00 (2013.01); B62J 45/00 (2020.02); B62L 3/02 (2013.01); B62M 25/08 (2013.01)

(58) Field of Classification Search
CPC . B62K 23/02; B62J 45/00; B62L 3/02; B62M 25/08
See application file for complete search history.

(56) References Cited

U.S. PATENT DOCUMENTS

| | | | | |
|---|---|---|---|---|
| 7,730,803 | B2 * | 6/2010 | Takamoto | B62M 25/08 74/473.12 |
| 8,781,679 | B2 * | 7/2014 | Ikemoto | B62K 25/28 701/37 |
| 8,781,680 | B2 * | 7/2014 | Ichida | B62J 99/00 701/37 |
| 8,886,417 | B2 * | 11/2014 | Jordan | B62M 9/132 701/51 |
| 8,909,424 | B2 * | 12/2014 | Jordan | H04W 74/08 701/36 |
| 8,931,365 | B2 * | 1/2015 | Fujii | B62M 25/08 74/502.2 |
| 9,229,712 | B2 * | 1/2016 | Takamoto | B62K 25/04 |
| 9,399,500 | B1 * | 7/2016 | Hashimoto | G08C 17/02 |
| 9,463,845 | B2 * | 10/2016 | Kuroda | F16H 63/304 |
| 9,522,714 | B2 * | 12/2016 | Komatsu | B62M 25/08 |
| 9,682,743 | B2 * | 6/2017 | Miyoshi | B62J 99/00 |

(Continued)

FOREIGN PATENT DOCUMENTS

| | | |
|---|---|---|
| CN | 101254812 | 9/2008 |
| CN | 101607581 | 12/2009 |

(Continued)

*Primary Examiner* — Tony H Winner
*Assistant Examiner* — Michael R Stabley
(74) *Attorney, Agent, or Firm* — Mori & Ward, LLP

(57) ABSTRACT

An operating switch device for a human-powered vehicle comprises an assist operating switch and a coupling structure. The assist operating switch is configured to receive a user operation input to operate an assist driving unit configured to assist a human power. The coupling structure is configured to detachably couple the assist operating switch to a base member of an operating device configured to be mounted to a handlebar. The base member includes a base body including a grip portion provided between a coupling end configured to be coupled to the handlebar and a free end opposite to the coupling end.

19 Claims, 20 Drawing Sheets

(56) References Cited

U.S. PATENT DOCUMENTS

| | | | |
|---|---|---|---|
| 10,363,992 B2* | 7/2019 | Watarai | B62M 9/122 |
| 10,457,350 B2* | 10/2019 | Kasai | B62K 23/02 |
| 10,513,307 B2* | 12/2019 | Komatsu | B62L 3/023 |
| 10,556,634 B2* | 2/2020 | Komatsu | B62J 1/08 |
| 10,556,638 B2* | 2/2020 | Sato | B62M 9/12 |
| 10,807,671 B2* | 10/2020 | Usui | B62M 6/45 |
| 2008/0210044 A1 | 9/2008 | De Perini | |
| 2009/0315692 A1* | 12/2009 | Miki | B62K 23/02 |
| | | | 340/432 |
| 2012/0221203 A1* | 8/2012 | Ichida | B62K 25/04 |
| | | | 701/37 |
| 2012/0253600 A1* | 10/2012 | Ichida | B62K 19/36 |
| | | | 701/37 |
| 2012/0253601 A1* | 10/2012 | Ichida | B60G 17/0195 |
| | | | 701/37 |
| 2014/0070930 A1* | 3/2014 | Hara | B62J 3/00 |
| | | | 340/432 |
| 2014/0345411 A1* | 11/2014 | Miki | B62M 25/08 |
| | | | 74/473.12 |
| 2015/0284049 A1* | 10/2015 | Shipman | B62K 23/06 |
| | | | 74/473.12 |
| 2016/0121962 A1 | 5/2016 | Miyoshi et al. | |
| 2018/0148127 A1 | 5/2018 | Sato et al. | |

FOREIGN PATENT DOCUMENTS

| | | |
|---|---|---|
| CN | 105564554 | 5/2016 |
| CN | 107839829 | 3/2018 |
| CN | 207773360 U | 8/2018 |
| JP | 2018-89989 | 6/2018 |

* cited by examiner

OPERATING APPARATUS FOR HUMAN-POWERED VEHICLE

BACKGROUND OF THE INVENTION

Field of the Invention

The present invention relates to an operating apparatus for a human-powered vehicle.

Discussion of the Background

A human-powered vehicle includes an operating unit configured to operate an electric component.

SUMMARY OF THE INVENTION

In accordance with a first aspect of the present invention, an operating switch device for a human-powered vehicle comprises an assist operating switch and a coupling structure. The assist operating switch is configured to receive a user operation input to operate an assist driving unit configured to assist a human power. The coupling structure is configured to detachably couple the assist operating switch to a base member of an operating device configured to be mounted to a handlebar. The base member includes a base body including a grip portion provided between a coupling end configured to be coupled to the handlebar and a free end opposite to the coupling end.

With the operating switch device according to the first aspect, it is possible to detachably couple the assist operating switch to the base member of the operating device. Thus, it is possible to improve operability of the assist driving unit with a simple structure.

In accordance with a second aspect of the present invention, the operating switch device according to the first aspect is configured so that the coupling structure is configured to detachably couple the assist operating switch to the base member of the operating device without coupling the assist operating switch directly to the handlebar.

With the operating switch device according to the second aspect, it is possible to easily arrange the assist operating switch near the operating device.

In accordance with a third aspect of the present invention, the operating switch device according to the first or second aspect is configured so that the coupling structure is configured to detachably couple the assist operating switch to at least one of the base body and a mounting clamp of the base member, the mounting clamp being configured to couple the base body to the handlebar.

With the operating switch device according to the third aspect, it is possible to improve flexibility in arrangement of the assist operating device relative to the operating device.

In accordance with a fourth aspect of the present invention, the operating switch device according to any one of the first to third aspects is configured so that the coupling structure includes a fastener configured to detachably couple the assist operating switch to the base member.

With the operating switch device according to the fourth aspect, it is possible to detachably couple the assist operating switch to the base member with a simple structure.

In accordance with a fifth aspect of the present invention, the operating switch device according to the fourth aspect is configured so that the fastener is configured to detachably couple the assist operating switch to at least one of the base body and a mounting clamp of the base member, the mounting clamp being configured to couple the base body to the handlebar.

With the operating switch device according to the fifth aspect, it is possible to improve flexibility in arrangement of the assist operating device relative to the operating device with detachably coupling the assist operating switch to the base member.

In accordance with a sixth aspect of the present invention, the operating switch device according to any one of the first to fifth aspects is configured so that the coupling structure includes one of a convex portion and a recess which is configured to be detachably coupled to the other of the convex portion and the recess provided on the base member.

With the operating switch device according to the sixth aspect, it is possible to detachably couple the assist operating switch to the base member with a simple structure.

In accordance with a seventh aspect of the present invention, the operating switch device according to the sixth aspect is configured so that the convex portion and the recess are configured to detachably couple the assist operating switch to at least one of the base body and a mounting clamp of the base member, the mounting clamp being configured to couple the base body to the handlebar.

With the operating switch device according to the seventh aspect, it is possible to improve flexibility in arrangement of the assist operating device relative to the operating device with detachably coupling the assist operating switch to the base member.

In accordance with an eighth aspect of the present invention, the operating switch device according to any one of the first to seventh aspects is configured so that the coupling structure includes an intermediate part configured to be provided between the base member and the handlebar in a state where the base member is mounted to the handlebar.

With the operating switch device according to the eighth aspect, it is possible to detachably couple the assist operating switch to the base member with a simple structure.

In accordance with a ninth aspect of the present invention, the operating switch device according to the eighth aspect is configured so that the intermediate part is configured to be provided between the handlebar and at least one of the base body and a mounting clamp of the base member, the mounting clamp being configured to couple the base body to the handlebar.

With the operating switch device according to the ninth aspect, it is possible to improve flexibility in arrangement of the assist operating device relative to the operating device with detachably coupling the assist operating switch to the base member.

In accordance with a tenth aspect of the present invention, the operating switch device according to any one of the first to ninth aspects further comprises an additional assist operating switch configured to receive an additional user operation input to operate the assist driving unit. The coupling structure is configured to detachably couple the assist operating switch and the additional assist operating switch to the base member.

With the operating switch device according to the tenth aspect, it is possible to reliably improve operability of the assist driving unit with a simple structure.

In accordance with an eleventh aspect of the present invention, the operating switch device according to the tenth aspect further comprises an additional switch configured to receive an additional user input. The coupling structure is configured to detachably couple the assist operating switch, the additional assist operating switch, and the additional switch to the base member.

With the operating switch device according to the eleventh aspect, it is possible to reliably improve operability of the assist driving unit or other components with a simple structure.

In accordance with a twelfth aspect of the present invention, the operating switch device according to any one of the first to eleventh aspects further comprises an informing unit configured to inform a user of information relating to the operating switch device. The coupling structure is configured to detachably couple the assist operating switch and the informing unit to the base member.

With the operating switch device according to the twelfth aspect, it is possible to inform a user of information relating to the operating switch device using the informing unit. Thus, it is possible to reliably improve operability of the assist driving unit or other components with a simple structure.

In accordance with a thirteenth aspect of the present invention, the operating switch device according to any one of the first to twelfth aspects further comprises a switch base member coupled to the coupling structure. The assist operating switch is mounted to the switch base member.

With the operating switch device according to the thirteenth aspect, it is possible to improve strength of the operating switch device.

In accordance with a fourteenth aspect of the present invention, the operating switch device according to any one of the first to thirteenth aspects further comprises a communication port configured to be connected to an electric cable. The coupling structure is configured to detachably couple the assist operating switch and the communication port to the base member.

With the operating switch device according to the fourteenth aspect, it is possible to reliably transmit signals or information between the operating switch device and another component.

In accordance with a fifteenth aspect of the present invention, the operating switch device according to any one of the first to fourteenth aspects further comprises a wireless communicator configured to wirelessly transmit an assist control signal in response to the user operation input. The coupling structure is configured to detachably couple the assist operating switch and the wireless communicator to the base member.

With the operating switch device according to the fifteenth aspect, it is possible to omit an electric cable, saving weight of the human-powered vehicle.

In accordance with a sixteenth aspect of the present invention, the operating switch device according to any one of the first to fifteenth aspects is configured so that the coupling structure includes a first connector configured to be electrically connected to a second connector of the base member. The first connector is configured to detachably couple the assist operating switch to the second connector.

With the operating switch device according to the sixteenth aspect, it is possible to detachably couple the assist operating switch to the base member using the first connector and the second connector. Thus, it is possible to reliably improve operability of the assist driving unit with a simple structure.

In accordance with a seventeenth aspect of the present invention, an operating apparatus for a human-powered vehicle comprises the operating switch device according to any one of the first to sixteenth aspects and the operating device. The operating device includes the base member and an operating member. The base member is configured to be mounted to the handlebar. The operating member is movably coupled to the base member. The base member includes a base body and a mounting clamp configured to couple the base body to the handlebar. The base body includes a coupling end configured to be coupled to the handlebar, a free end opposite to the coupling end, and a grip portion provided between the coupling end and the free end. The mounting clamp is secured to the coupling end. The coupling structure is configured to detachably couple the assist operating switch to at least one of the coupling, and the free end, and the mounting clamp.

With the operating apparatus according to the seventeenth aspect, it is possible to detachably couple the assist operating switch to the base member of the operating device. Thus, it is possible to improve operability of the assist driving unit with a simple structure.

In accordance with an eighteenth aspect of the present invention, the operating apparatus according to the seventeenth aspect is configured so that the coupling structure of the operating switch device includes a fastener configured to detachably couple the assist operating switch to the base member. The base member includes a threaded hole. The fastener is configured to be threadedly engaged in the threaded hole.

With the operating apparatus according to the eighteenth aspect, it is possible to detachably couple the assist operating switch to the base member with a simple structure.

In accordance with a nineteenth aspect of the present invention, the operating apparatus according to the seventeenth or eighteenth aspect is configured so that the coupling structure of the operating switch device includes one of a convex portion and a recess. The base member includes the other of the convex portion and the recess. The convex portion is configured to be provided in the recess in a state where the coupling structure detachably couples the assist operating switch to the base member.

With the operating apparatus according to the nineteenth aspect, it is possible to detachably couple the assist operating switch to the base member with a simple structure.

In accordance with a twentieth aspect of the present invention, the operating apparatus according to any one of the seventeenth to nineteenth aspects is configured so that the coupling structure of the operating switch device includes an intermediate part configured to be provided between the base member and the handlebar in a state where the base member is mounted to the handlebar.

With the operating apparatus according to the twentieth aspect, it is possible to detachably couple the assist operating switch to the base member with a simple structure.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
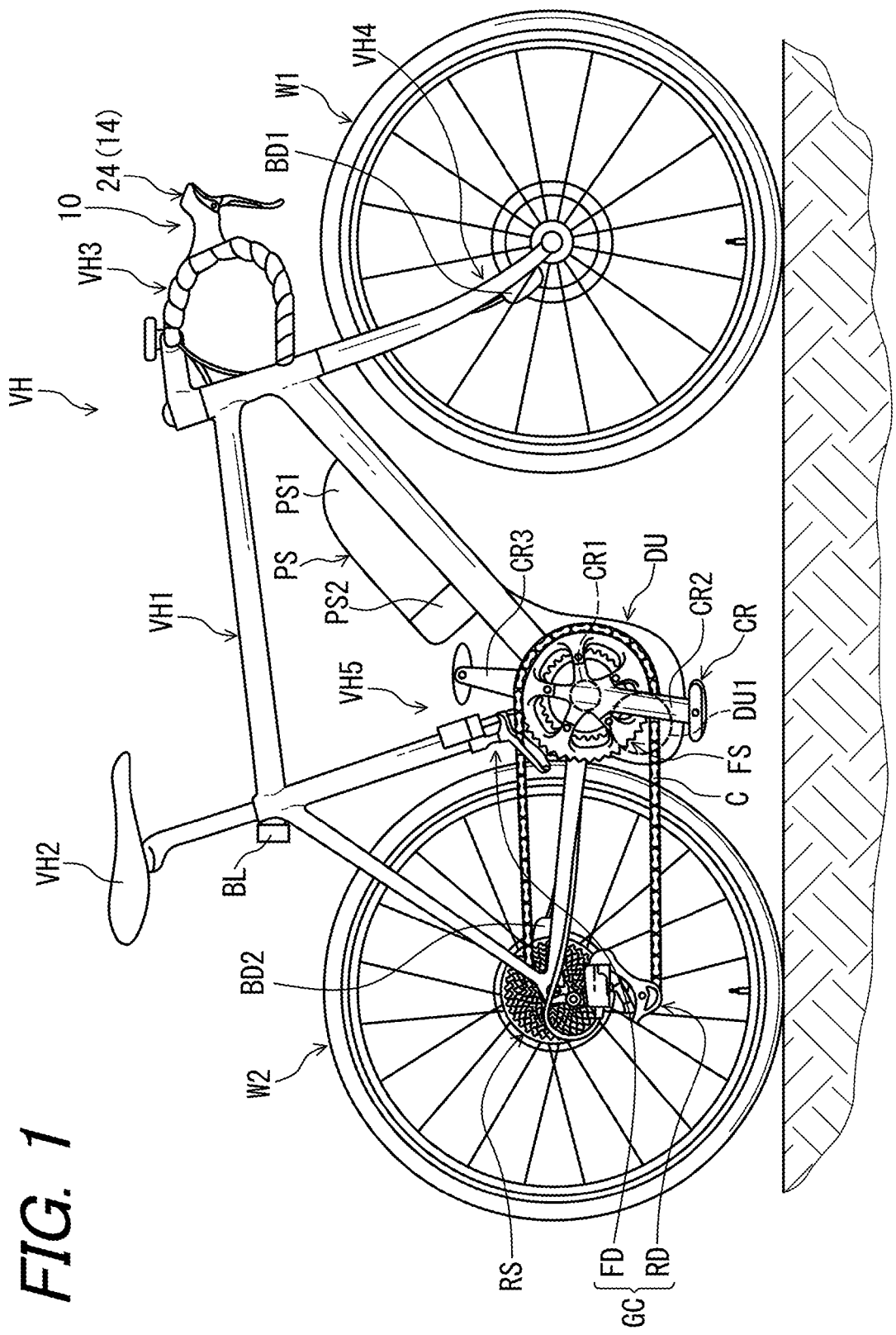
FIG. 1 is a side elevational view of a human-powered vehicle including an operating apparatus in accordance with a first embodiment.

The embodiment(s) will now be described with reference to the accompanying drawings, wherein like reference numerals designate corresponding or identical elements throughout the various drawings.

First Embodiment

Referring initially to FIG. 1, a human-powered vehicle VH includes an operating apparatus 10 in accordance with a first embodiment. For example, the human-powered vehicle VH is a vehicle to travel with a motive power including at least a human power of a user who rides the human-powered vehicle VH (i.e., rider). The human-powered vehicle VH has an arbitrary number of wheels. For example, the human-powered vehicle VH has at least one wheel. In this embodiment, the human-powered vehicle VH preferably has a smaller size than that of a four-wheeled automobile. However, the human-powered vehicle VH can have an arbitrary size. Examples of the human-powered vehicle VH include a bicycle, a tricycle, and a kick scooter. In this embodiment, the human-powered vehicle VH is a bicycle. An electric assisting system including an electric motor can be applied to the human-powered vehicle VH (e.g., the bicycle) to assist muscular motive power of the user. Namely, the human-powered vehicle VH can be an E-bike. While the human-powered vehicle VH is illustrated as a road bike, the operating apparatus 10 can be applied to time trial bikes or any type of human-powered vehicles.

The human-powered vehicle VH further includes a vehicle body VH1, a saddle VH2, a handlebar VH3, a front fork VH4, a drive train VH5, a first brake device BD1, a second brake device BD2, a first wheel W1, and a second wheel W2. The front fork VH4 is rotatably mounted to the vehicle body VH1. The handlebar VH3 is secured to the front fork VH4. The first wheel W1 is rotatably coupled to the front fork VH4. The second wheel W2 is rotatably coupled to the vehicle body VH1. The first brake device BD1 is configured to apply a braking force to the first wheel W1. The second brake device BD2 is configured to apply a braking force to the second wheel W2.

In the present application, the following directional terms "front," "rear," "forward," "rearward," "left," "right," "transverse," "upward" and "downward" as well as any other similar directional terms refer to those directions which are determined on the basis of a user (e.g., a rider) who is in the user's standard position (e.g., on the saddle VH2 or a seat) in the human-powered vehicle VH with facing the handlebar VH3. Accordingly, these terms, as utilized to describe the operating apparatus 10 or other components, should be interpreted relative to the human-powered vehicle VH equipped with the operating apparatus 10 as used in an upright riding position on a horizontal surface.

The drive train VH5 includes a crank assembly CR, a front sprocket assembly FS, a rear sprocket assembly RS, a chain C, and a gear changing device GC. The front sprocket assembly FS is secured to the crank assembly CR and includes a plurality of front sprockets. The rear sprocket assembly RS is rotatably mounted to the vehicle body VH1 and includes a plurality of rear sprockets. The chain C is engaged with the front sprocket assembly FS and the rear sprocket assembly RS. The gear changing device GC includes a gear changing unit FD and a gear changing unit RD. The gear changing unit FD is mounted to the vehicle body VH1 and is configured to shift the chain C relative to the front sprocket assembly FS to change a gear position of the gear changing unit FD. The gear changing unit RD is mounted to the vehicle body VH1 and is configured to shift the chain C relative to the rear sprocket assembly RS to change a gear position of the gear changing unit RD. The gear changing device GC has a gear ratio. The gear ratio is a ratio of a rotational speed of the rear sprocket assembly RS to a rotational speed of the front sprocket assembly FS. In this embodiment, the gear changing unit FD includes a derailleur. The gear changing unit RD includes a derailleur. However, each of the gear changing unit FD and the gear changing unit RD can include another device such as an internal gear hub. At least one of the gear changing units FD and RD can be omitted from the drive train VH5.

The human-powered vehicle VH includes an assist driving unit DU configured to assist a human power. The assist driving unit DU includes an assist motor DU1 configured to impart propulsion to the human-powered vehicle VH. The crank assembly CR includes a crank axle CR1 and crank arms CR2 and CR3. The crank aims CR2 and CR3 are secured to the crank axle CR1. For example, the assist driving unit DU is configured to apply an assist driving force to the crank assembly CR.

Figure 2:
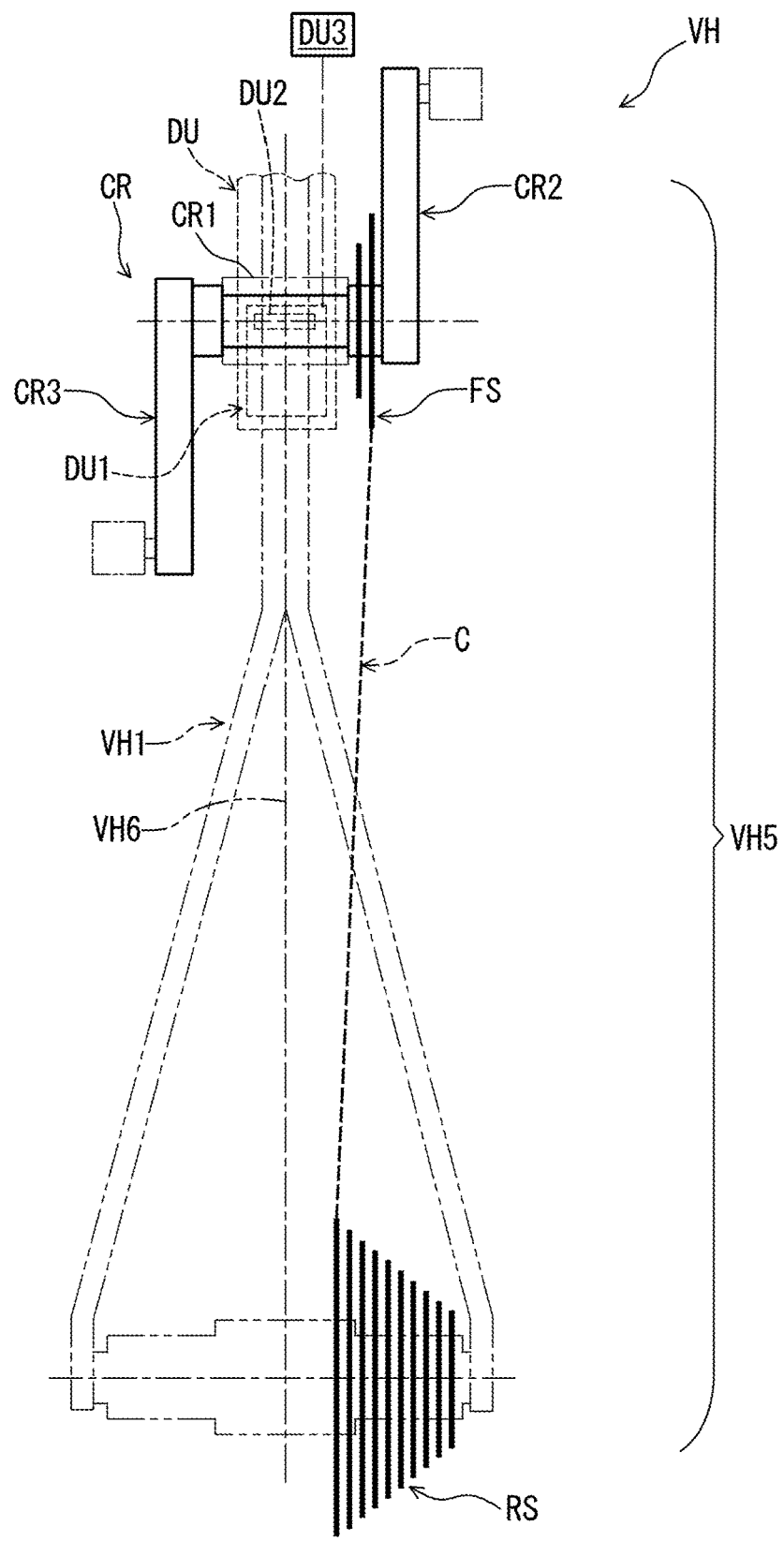
FIG. 2 is a schematic diagram of a drive train of the human-powered vehicle illustrated in FIG. 1.

As seen in FIG. 2, the assist driving unit DU comprises a pedaling-force sensor DU2 configured to sense a pedaling force applied to the crank assembly CR from a rider. The assist driving unit DU includes a motor controller DU3 configured to control the assist motor DU1 to add the assist driving force to the drive train VH5 based on an assist ratio and the pedaling force sensed by the pedaling-force sensor DU2. The motor controller DU3 is configured to select and/or calculate the assist ratio. However, the motor controller DU3 can be configured to control the assist motor DU1 to add the assist driving force to the drive train VH5 regardless of the assist ratio and/or the pedaling force. For example, the motor controller DU3 is configured to control the assist motor DU1 to add the assist driving force to the crank assembly CR based on a user input received by the operating apparatus 10.

As seen in FIG. 1, the human-powered vehicle VH includes a power supply PS and a brake lamp BL. The power supply PS is electrically connected to the assist driving unit DU, the gear changing device GC, and the brake lamp BL to supply electricity to the assist driving unit DU, the gear changing device GC, and the brake lamp BL. The power supply PS includes a battery PS1 and a battery holder PS2. Examples of the battery PS1 include a primary battery such as a lithium manganese dioxide battery, and a secondary battery such as a lithium-ion secondary battery. In this embodiment, the battery PS1 is the secondary battery. The battery PS1 is detachably attached to the battery holder PS2 to supply electricity to the assist driving unit DU, the gear changing device GC, and the brake lamp BL. For example, the battery PS1 a replaceable and/or rechargeable battery. The battery holder PS2 is electrically connected to the assist driving unit DU, the gear changing device GC, and the brake lamp BL to supply electricity from the battery PS1 to the assist driving unit DU, the gear changing device GC, and the brake lamp BL. In this embodiment, the power supply PS is mounted to the vehicle body VH1. However, the location of the power supply PS is not limited to this embodiment. The battery holder PS2 can be provided in the vehicle body VH1. The human-powered vehicle VH can include another power supply configured to supply electricity to the assist driving unit DU, the gear changing device GC, and the brake lamp BL instead of or in addition to the power supply PS.

Figure 3:
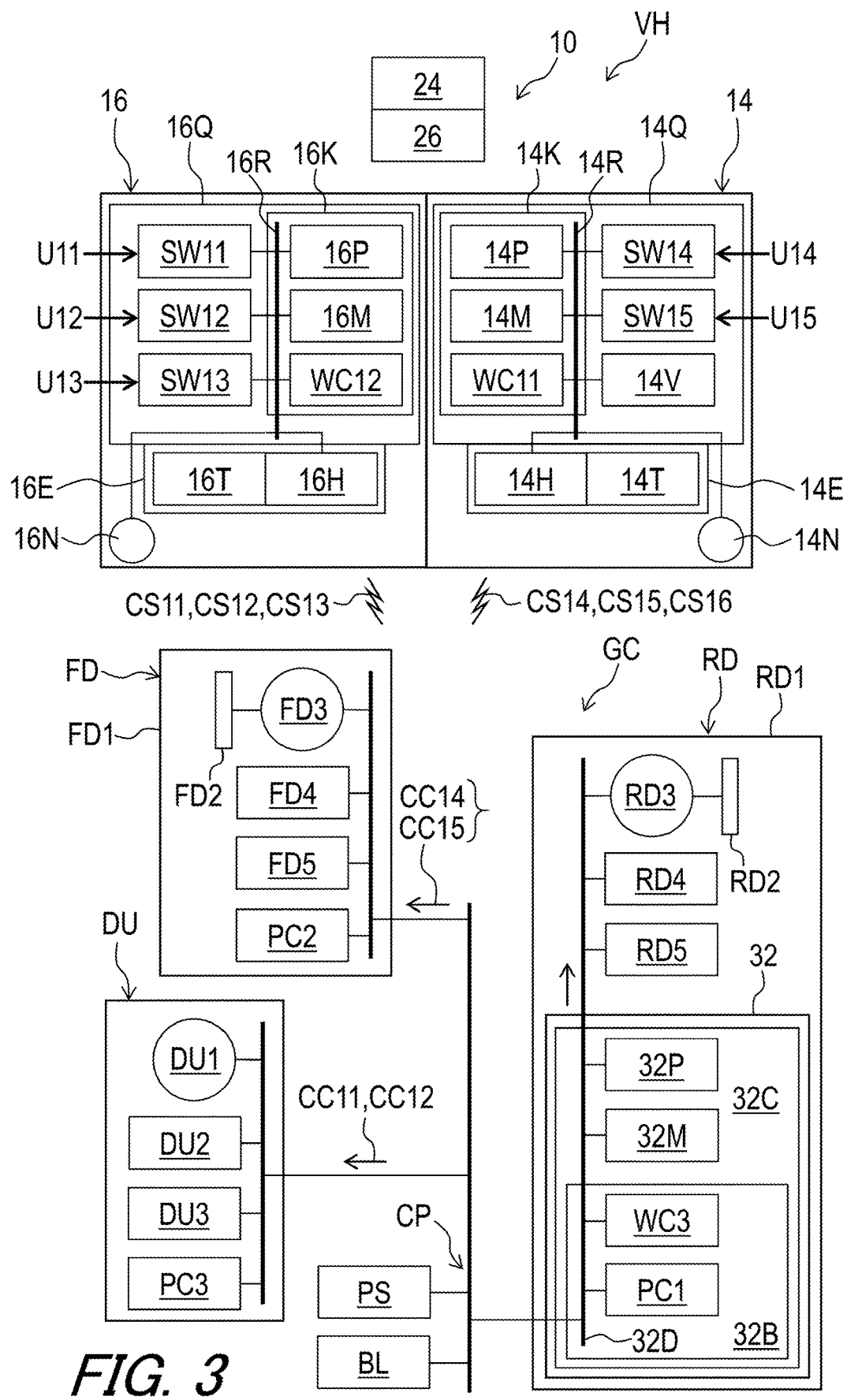
FIG. 3 is a schematic block diagram of the human-powered vehicle illustrated in FIG. 1.

As seen in FIG. 3, the human-powered vehicle VH includes an electric communication path CP. The power supply PS is electrically connected to the assist driving unit DU, the gear changing device GC, and the brake lamp BL with the electric communication path CP to supply electricity to the assist driving unit DU, the gear changing device GC, and the brake lamp BL through the electric communication path CP. For example, the electric communication path CP includes at least one electric cable and/or at least one junction.

Figure 4:
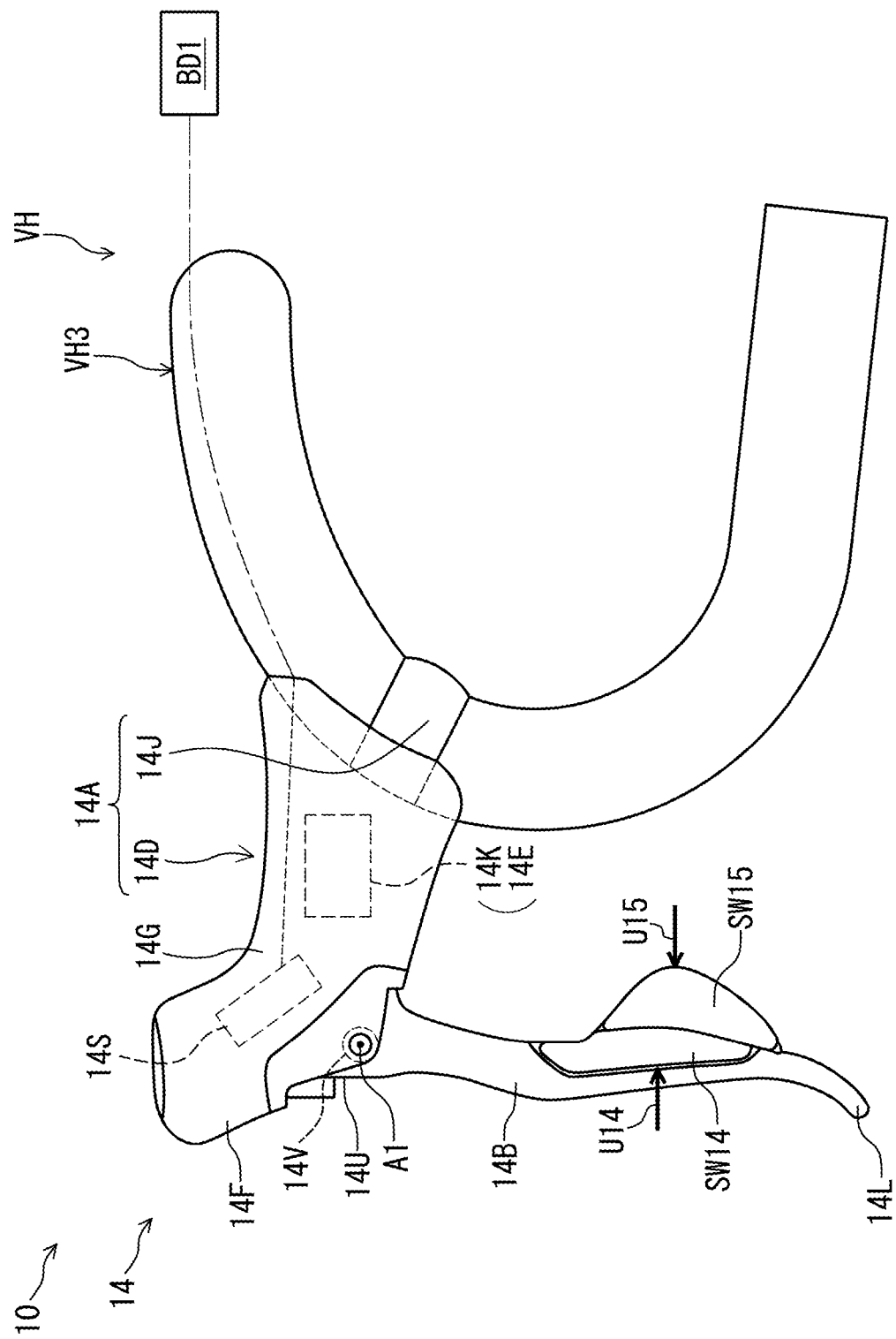
FIG. 4 is a side elevational view of an operating device of the operating apparatus of the human-powered vehicle illustrated in FIG. 1.

As seen in FIG. 4, the operating apparatus 10 for the human-powered vehicle VH comprises an operating device 14. The operating device 14 includes a base member 14A and an operating member 14B. The base member 14A is configured to be mounted to the handlebar VH3. The operating member 14B is movably coupled to the base member 14A. In this embodiment, the operating member 14B is pivotally coupled to the base member 14A about a pivot axis A1. The operating device 14 is configured to operate the brake device BD1. The operating device 14 is configured to actuate the brake device BD1 in response to a movement of the operating member 14B relative to the base member 14A. For example, the operating device 14 includes a brake operating structure 14S configured to operate the brake device BD1 with a movement transmission member such as a wire or a hydraulic fluid. The brake operating structure 14S is configured to be coupled to the brake device BD1 with the movement transmission member.

In this embodiment, the operating member 14B includes a lower end 14L and a upper end 14U that is closer to the base member 14A than the lower end 14L. The lower end 14L is positioned below the upper end 14U while the operating device 14 is mounted to the handlebar VH3. However, the structure of the operating member 14B is not limited to this embodiment.

The base member 14A includes a base body 14D. The base body 14D includes a coupling end 14C and a free end 14F. The coupling end 14C is configured to be coupled to the handlebar VH3. The free end 14F is opposite to the coupling end 14C. The base body 14D includes a grip portion 14G. The grip portion 14G is provided between the coupling end 14C and the free end 14F. The base member 14A includes a mounting clamp 14J. The mounting clamp 14J is configured to couple the base body 14D to the handlebar VH3. The mounting clamp 14J is secured to the coupling end 14C. However, the grip portion 14G can be omitted from the base member 14A.

Figure 5:
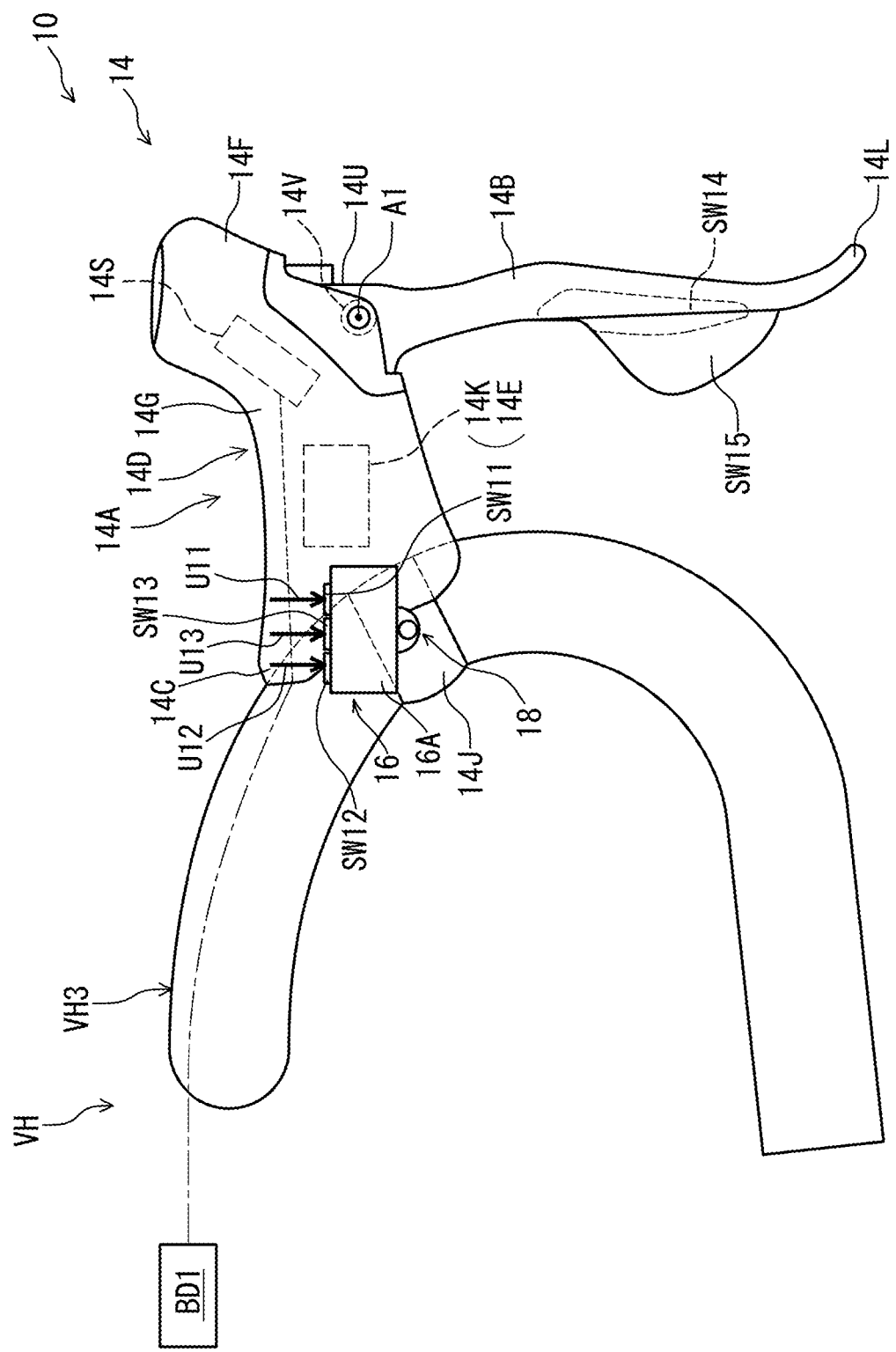
FIG. 5 is a side elevational view of the operating device and an operating switch device of the operating apparatus of the human-powered vehicle illustrated in FIG. 1.

As seen in FIG. 5, the operating apparatus 10 for the human-powered vehicle VH comprises an operating switch device 16. The operating switch device 16 is a separate device from the operating device 14 and is detachably coupled to the operating device 14. The operating switch device 16 for the human-powered vehicle VH comprises an assist operating switch SW11. The assist operating switch SW11 is configured to receive a user operation input U11 to operate the assist driving unit DU configured to assist a human power.

The operating switch device 16 for the human-powered vehicle VH comprises a coupling structure 18. The coupling structure 18 is configured to detachably couple the assist operating switch SW11 to the base member 14A of the operating device 14 configured to be mounted to the handlebar VH3. The coupling structure 18 is configured to detachably couple the assist operating switch SW11 to at least one of the base body 14D and the mounting clamp 14J of the base member 14A. The coupling structure 18 is configured to detachably couple the assist operating switch SW11 to at least one of the coupling end 14C, the free end 14F, and the mounting clamp 14J. In this embodiment, the coupling structure 18 is configured to detachably couple the assist operating switch SW11 to the coupling end 14C and the mounting clamp 14J. However, the coupling structure 18 can be configured to detachably couple the assist operating switch SW11 to the coupling end 14C, the free end 14F, the mounting clamp 14J, and/or other portions of the operating device 14.

In this embodiment, the coupling structure 18 is configured to detachably couple the assist operating switch SW11 to the base member 14A of the operating device 14 without coupling the assist operating switch SW11 directly to the handlebar VH3. The coupling structure 18 is configured to detachably couple the assist operating switch SW11 to the base body 14D and the mounting clamp 14J. However, the coupling structure 18 can be configured to detachably couple the assist operating switch SW11 to only one of the base body 14D and the mounting clamp 14J or other portions of the operating device 14.

The operating device 14 includes a movement detector 14V configured to detect that the operating member 14B is operated from a rest position relative to the base member 14A. The movement detector 14V is coupled to the operating member 14B to detect the pivotal movement of the operating member 14B.

Figure 6:
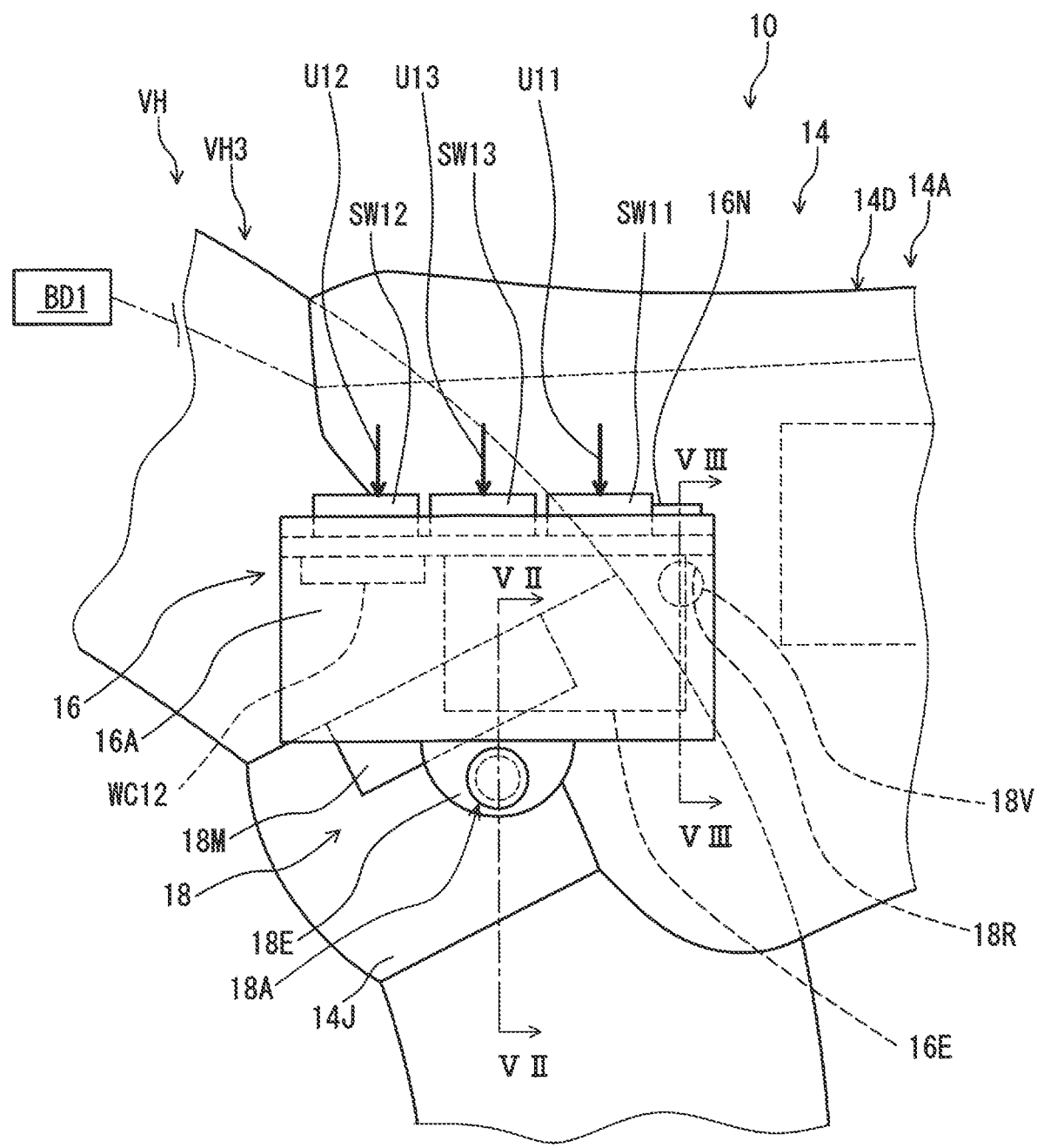
FIG. 6 is a partial side elevational view of the operating device and the operating switch device of the operating apparatus of the human-powered vehicle illustrated in FIG. 1.

As seen in FIG. 6, the coupling structure 18 includes a fastener 18A configured to detachably couple the assist operating switch SW11 to the base member 14A. The fastener 18A is configured to detachably couple the assist operating switch SW11 to at least one of the base body 14D and the mounting clamp 14J of the base member 14A. In this embodiment, the fastener 18A is configured to detachably couple the assist operating switch SW11 to the mounting clamp 14J. However, the fastener 18A can be configured to detachably couple the assist operating switch SW11 to the base body 14D or both the base body 14D and the mounting clamp 14J.

The operating switch device 16 further comprises an additional assist operating switch SW12. The additional assist operating switch SW12 is configured to receive an additional user operation input U12 to operate the assist driving unit. The coupling structure 18 is configured to detachably couple the assist operating switch SW11 and the additional assist operating switch SW12 to the base member 14A. The coupling structure 18 is configured to detachably couple the assist operating switch SW11 and the additional assist operating switch SW12 to the base member 14A without coupling the assist operating switch SW11 and the additional assist operating switch SW12 directly to the handlebar VH3.

The operating switch device 16 further comprises an additional switch SW13 configured to receive an additional user input U13. The coupling structure 18 is configured to detachably couple the assist operating switch SW11, the additional assist operating switch SW12, and the additional switch SW13 to the base member 14A. The coupling structure 18 is configured to detachably couple the assist operating switch SW11, the additional assist operating switch SW12, and the additional switch SW13 to the base member 14A without coupling the assist operating switch SW11, the additional assist operating switch SW12, and the additional switch SW13 directly to the handlebar VH3.

Each of the assist operating switch SW11, the additional assist operating switch SW12, and the additional switch SW13 includes a normally open switch. Examples of each of the assist operating switch SW11, the additional assist operating switch SW12, and the additional switch SW13 includes a push-button switch and a lever switch. However, the structures of the assist operating switch SW11, the additional assist operating switch SW12, and the additional switch SW13 are not limited to this embodiment. At least one of the additional assist operating switch SW12 and the additional switch SW13 can be omitted from the operating switch device 16.

The assist operating switch SW11 is configured to receive the user operation input U11 indicating a change in the assist driving force of the assist driving unit DU. The additional assist operating switch SW12 is configured to receive the additional user operation input U12 indicating a change in the assist driving force of the assist driving unit DU. In this embodiment, an increase in the assist driving force of the assist driving unit DU. The additional assist operating switch SW12 is configured to receive the additional user operation input U12 indicating a decrease in the assist driving force of the assist driving unit DU. The additional switch SW13 is configured to receive the additional user input U13 indicating a control of an additional electric component such as the gear changing unit FD, the gear changing unit RD, an adjustable seatpost, an internal gear hub, a front suspension, a rear suspension, a cycle computer, a smartphone, a tablet computer, or a light emitting device. However, the user operation input U11, the additional user operation input U12, and the additional user input U13 are not limited to this embodiment. The assist operating switch SW11, the additional assist operating switch SW12, and the additional switch SW13 can be used for operating other components.

The operating switch device 16 further comprises a switch base member 16A coupled to the coupling structure 18. The assist operating switch SW11 is mounted to the switch base member 16A. The additional assist operating switch SW12 is mounted to the switch base member 16A. The additional switch SW13 is mounted to the switch base member 16A. The coupling structure 18 is configured to detachably couple the switch base member 16A to the base member 14A. The switch base member 16A includes an accommodation space. The assist operating switch SW11, the additional assist operating switch SW12, and the additional switch SW13 are at least partly provided in the accommodation space of the switch base member 16A.

Figure 7:
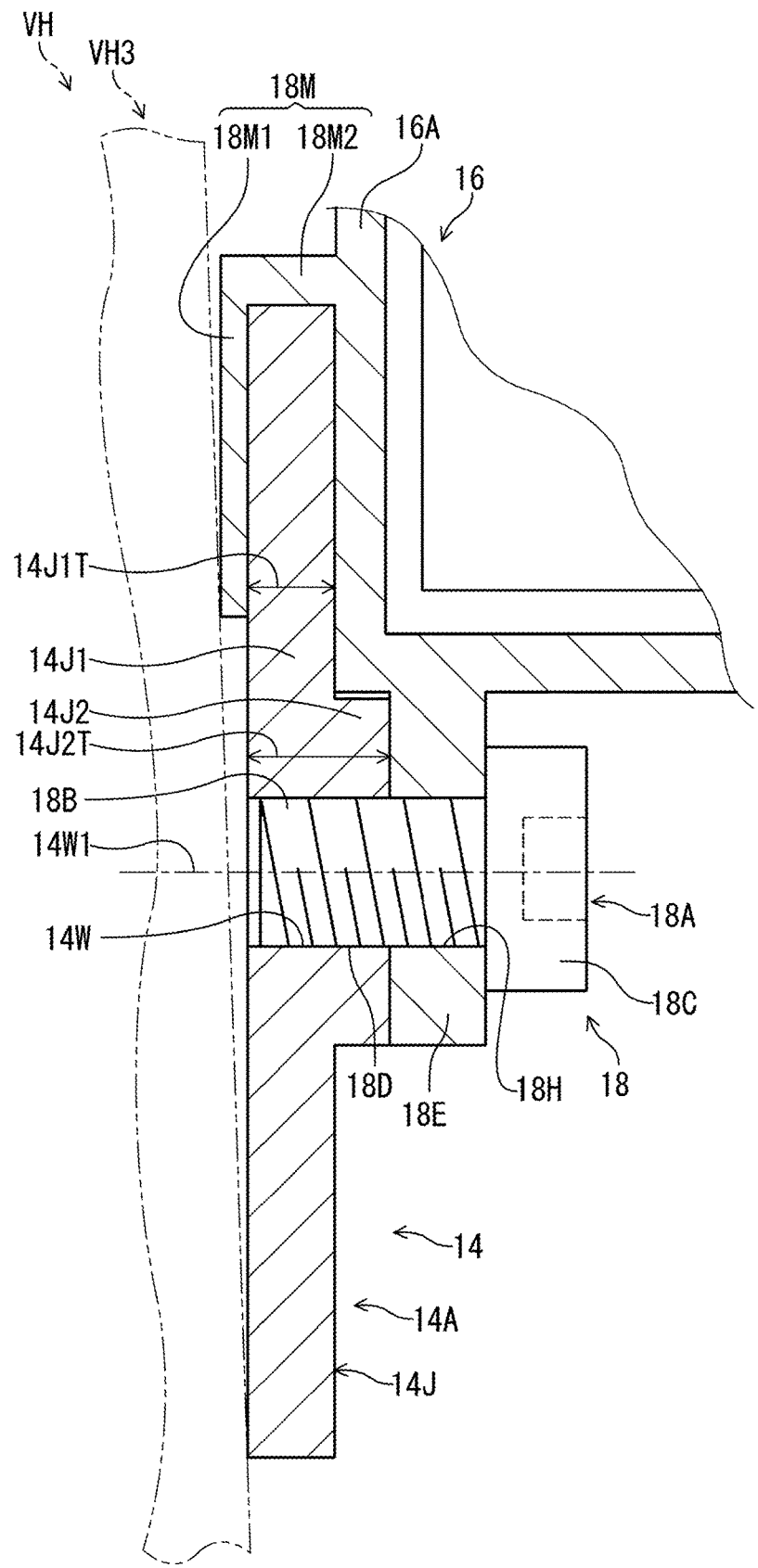
FIG. 7 is a cross-sectional view of the operating device and the operating switch device of the operating apparatus taken along line VII-VII of FIG. 6.

As seen in FIG. 7, the fastener 18A includes a fastener body 18B and a head part 18C. The fastener body 18B has an elongated shape. The head part 18C is provided at an end of the fastener body 18B. The fastener body 18B includes an externally threaded part 18D. The base member 14A includes a threaded hole 14W. The mounting clamp 14J includes the threaded hole 14W. The fastener 18A is configured to be threadedly engaged in the threaded hole 14W. The threaded hole 14W includes a center axis 14W1. The threaded hole 14W extends along the center axis 14W1. In this embodiment, the mounting clamp 14J includes a first portion 14J1 and a second portion 14J2. The first portion 14J1 has a first thickness 14J1T defined along the center axis 14W1 of the threaded hole 14W. The second portion 14J2 has a second thickness 14J2T defined along the center axis 14W1 of the threaded hole 14W. The second thickness 14J2T is larger than the first thickness 14J1T. The second portion 14J2 includes the threaded hole 14W. The second portion 14J2 has a tubular shape. However, the structure of the mounting clamp 14J is not limited to this embodiment. The coupling structure 18 includes a coupled part 18E. The coupled part 18E is coupled to the switch base member 16A and extends from the switch base member 16A. The coupled part 18E includes a through-hole 18H. The fastener 18A extends through the through-hole 18H of the coupled part 18E.

The coupling structure 18 of the operating switch device 16 includes an intermediate part 18M. The intermediate part 18M is configured to be provided between the base member 14A and the handlebar VH3 in a state where the base member 14A is mounted to the handlebar VH3. The intermediate part 18M is configured to be provided between the handlebar VH3 and at least one of the base body 14D and the mounting clamp 14J of the base member 14A. In this embodiment, the intermediate part 18M is configured to be provided between the handlebar VH3 and the mounting clamp 14J. However, the intermediate part 18M can be configured to be provided between the handlebar VH3 and the base body 14D or the handlebar VH3 and both the base body 14D and the mounting clamp 14J.

The intermediate part 18M extends from the switch base member 16A. The intermediate part 18M includes an intermediate body 18M1 and a coupling body 18M2. The intermediate body 18M1 extends along an outer surface of the switch base member 16A. The coupling body 18M2 couples the intermediate body 18M1 to the switch base member 16A. The mounting clamp 14J is provided between the switch base member 16A and the intermediate body 18M1 of the intermediate part 18M.

Figure 8:
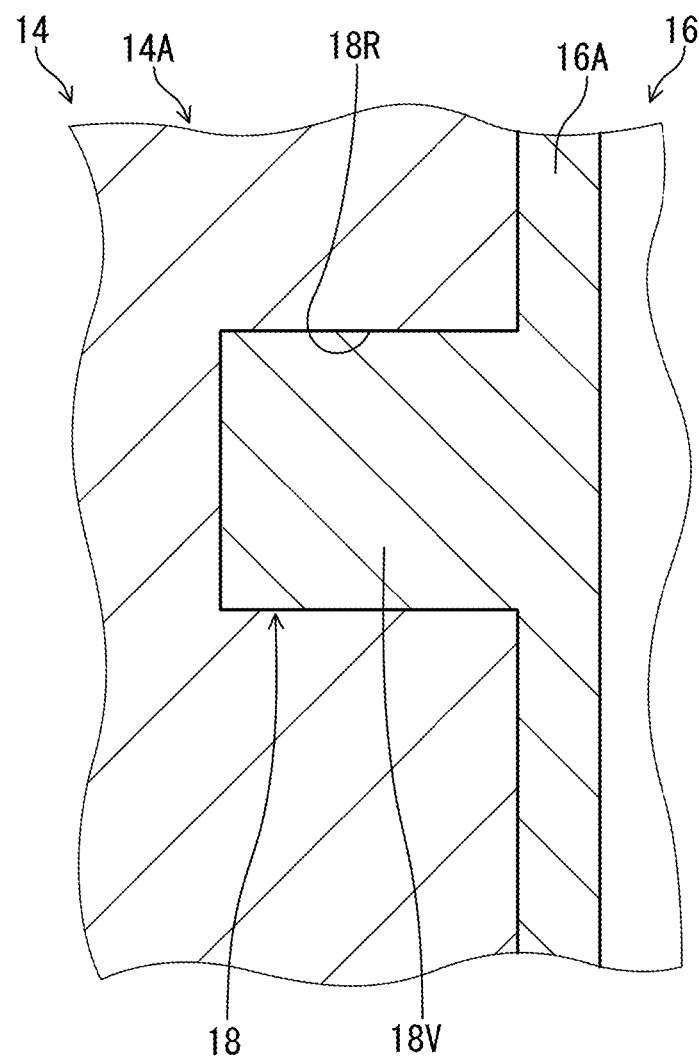
FIG. 8 is a cross-sectional view of the operating device and the operating switch device of the operating apparatus taken along line VIII-VIII of FIG. 6.

As seen in FIG. 8, the coupling structure 18 of the operating switch device 16 includes one of a convex portion 18V and a recess 18R. The base member 14A includes the other of the convex portion 18V and the recess 18R. The one of the convex portion 18V and the recess 18R is configured to be detachably coupled to the other of the convex portion 18V and the recess 18R provided on the base member 14A. The convex portion 18V and the recess 18R are configured to detachably couple the assist operating switch SW11 to at least one of the base body 14D and the mounting clamp 14J of the base member 14A. The convex portion 18V is configured to be provided in the recess 18R in a state where the coupling structure 18 detachably couples the assist operating switch SW11 to the base member 14A.

In this embodiment, the coupling structure 18 includes the convex portion 18V provided on the switch base member 16A. The recess 18R is provided on the base member 14A. However, the coupling structure 18 can include the recess 18R provided on the switch base member 16A. The convex portion 18V can be provided on the base member 14A.

As seen in FIG. 4, the operating device 14 includes a first electrical switch SW14 and a second electrical switch SW15. The first electrical switch SW14 is configured to receive a first user operation input U14 to operate an electric component. The second electrical switch SW15 is configured to receive a second user operation input U15 to operate an electric component. In this embodiment, the first electrical switch SW14 is configured to receive the first user operation input U14 indicating upshifting of the gear changing unit FD. The second electrical switch SW15 is configured to receive the second user operation input U15 indicating downshifting of the gear changing unit FD. However, the first electrical switch SW14 and the second electrical switch SW15 can be used to operate another electric component such as the gear changing unit RD, an adjustable seatpost, an internal gear hub, a front suspension, a rear suspension, a cycle computer, a smartphone, a tablet computer, or a light emitting device.

In this embodiment, the first electrical switch SW14 and the second electrical switch SW15 are mounted to the operating member 14B. However, the locations of the first electrical switch SW14 and the second electrical switch SW15 are not limited to this embodiment. At least one of the first electrical switch SW14 and the second electrical switch SW15 can be omitted from the operating device 14.

Figure 9:
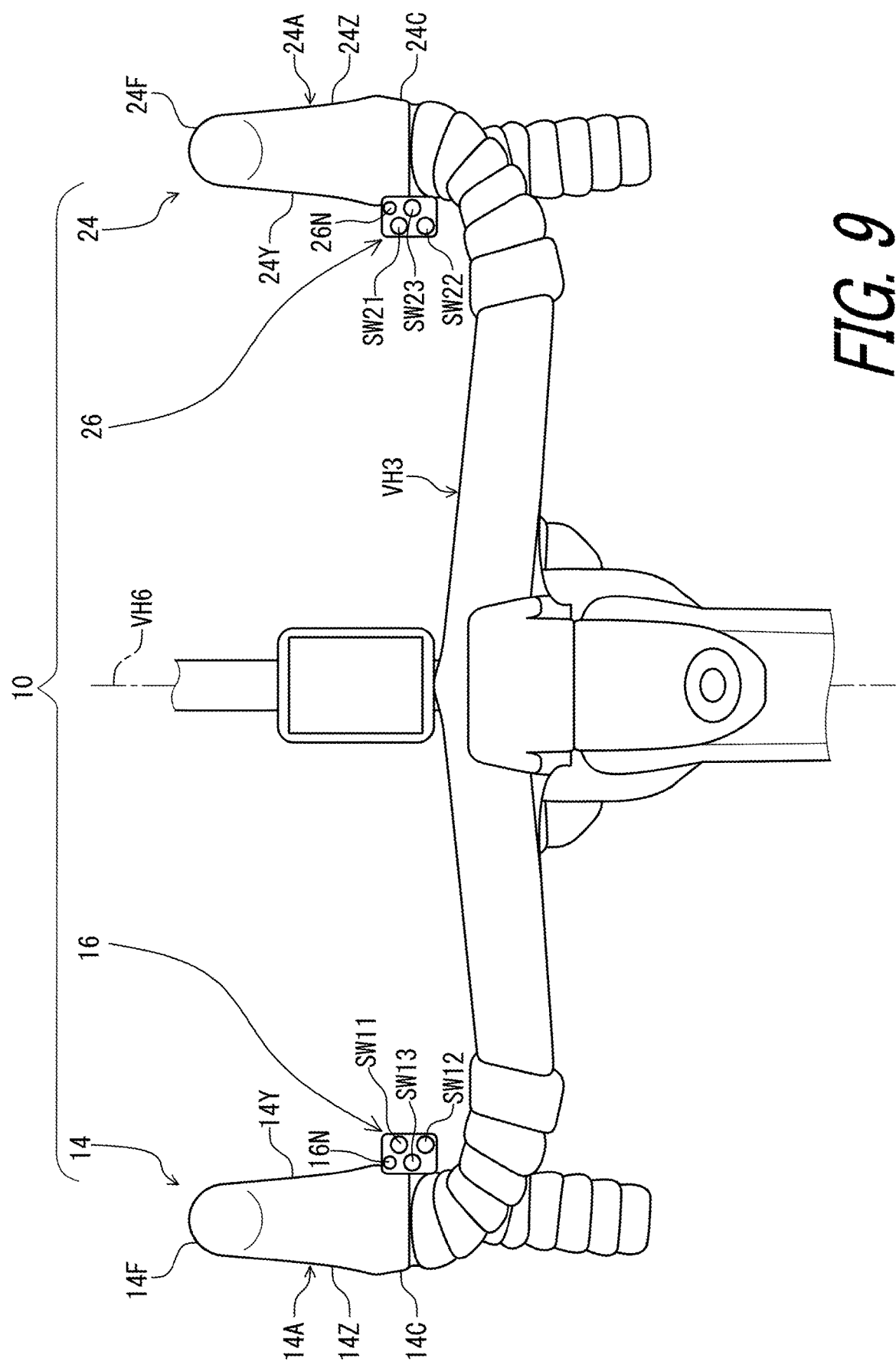
FIG. 9 is a plan view of the operating apparatus and a handlebar of the human-powered vehicle illustrated in FIG. 1.

As seen in FIG. 9, the base member 14A includes an inner lateral surface 14Y and an outer lateral surface 14Z. The inner lateral surface 14Y is provided between the outer lateral surface 14Z and a center plane VH6 of the human-powered vehicle VH. In this embodiment, the operating switch device 16 is mounted on the inner lateral surface 14Y of the base member 14A. However, the location of the operating switch device 16 is not limited to this embodiment. The operating switch device 16 can be mounted on the outer lateral surface 14Z of the base member 14A.

The operating switch device 16 further comprises an informing unit 16N. The informing unit 16N is configured to inform a user of information relating to the operating switch device 16. For example, the informing unit 16N includes a light emitting element. As seen in FIG. 6, the coupling structure 18 is configured to detachably couple the assist operating switch SW11 and the informing unit 16N to the base member 14A. The informing unit 16N is mounted to the switch base member 16A.

Figure 10:
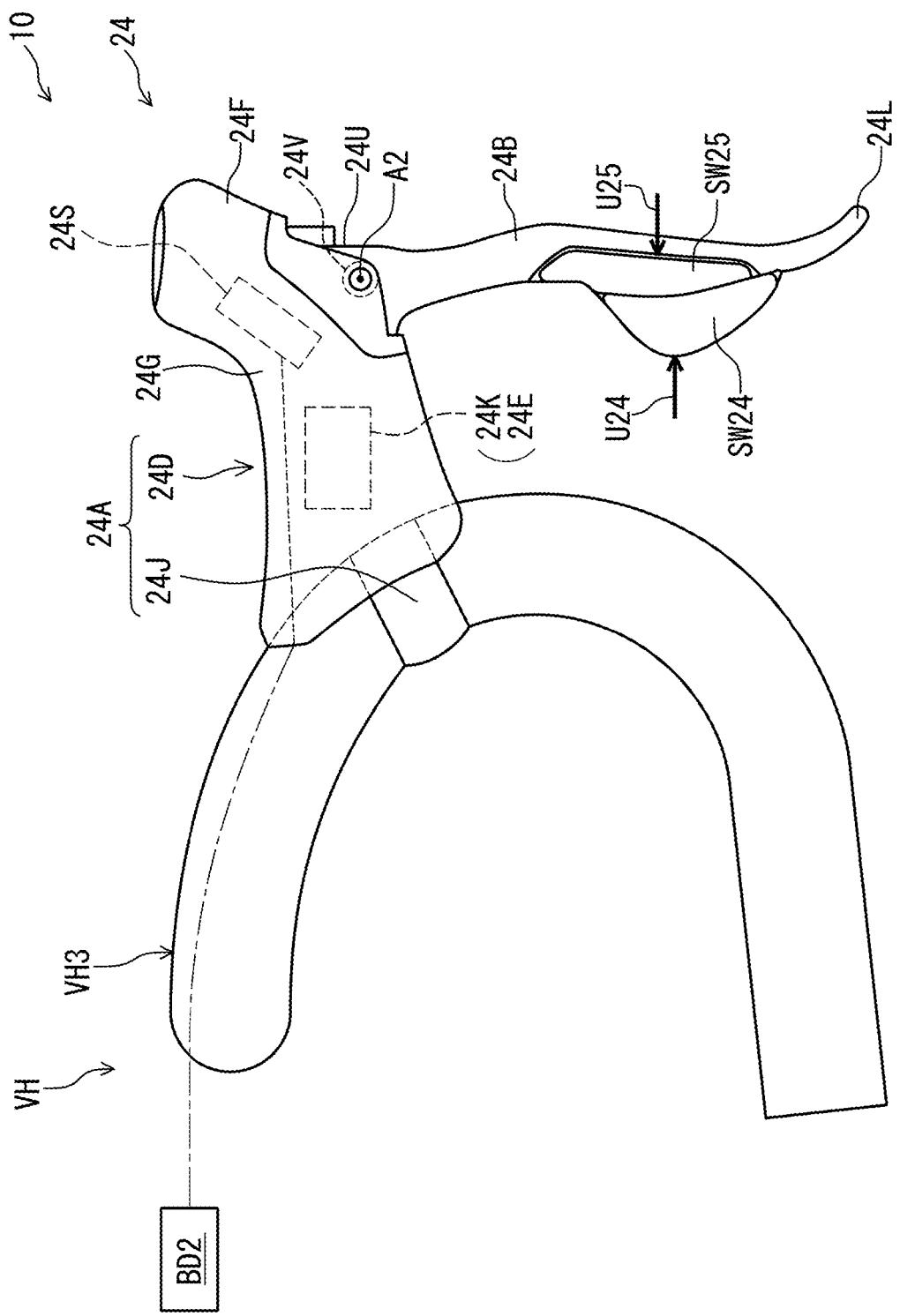
FIG. 10 is a side elevational view of an operating device of the operating apparatus of the human-powered vehicle illustrated in FIG. 1.

As seen in FIG. 10, the operating apparatus 10 for the human-powered vehicle VH comprises an operating device 24. The operating device 24 has substantially the same structure as the structure of the operating device 14 except that the operating device 24 has a symmetrical shape with the operating device 14 with respect to the center plane VH6 (see FIG. 9). The description of the operating device 14 can be utilized as the description of the operating device 24 by replacing "14" and "A1" of the description with "24" and "A2." Thus, they will not be described in detail here for the sake of brevity.

Figure 11:
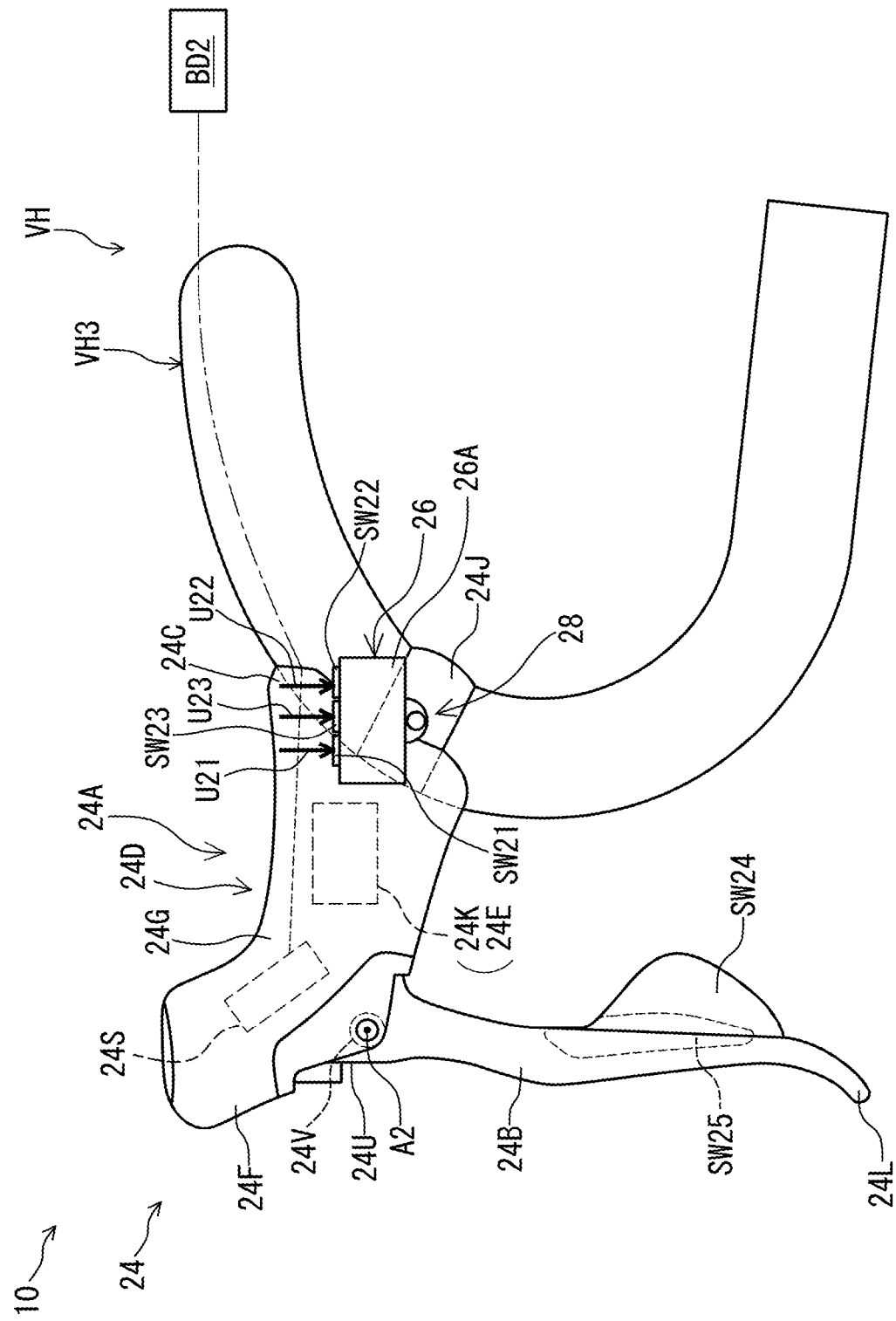
FIG. 11 is a side elevational view of the operating device and an operating switch device of the operating apparatus of the human-powered vehicle illustrated in FIG. 1.

As seen in FIG. 11, the operating apparatus 10 for the human-powered vehicle VH comprises an operating switch device 26. The operating switch device 26 has substantially the same structure as the structure of the operating switch device 16 except that the operating switch device 26 has a symmetrical shape with the operating switch device 16 with respect to the center plane VH6 (see FIG. 9). The description of the operating device 14 can be utilized as the description of the operating switch device 26 by replacing the numeral reference "16" of the description with "26." Thus, they will not be described in detail here for the sake of brevity.

Figure 12:
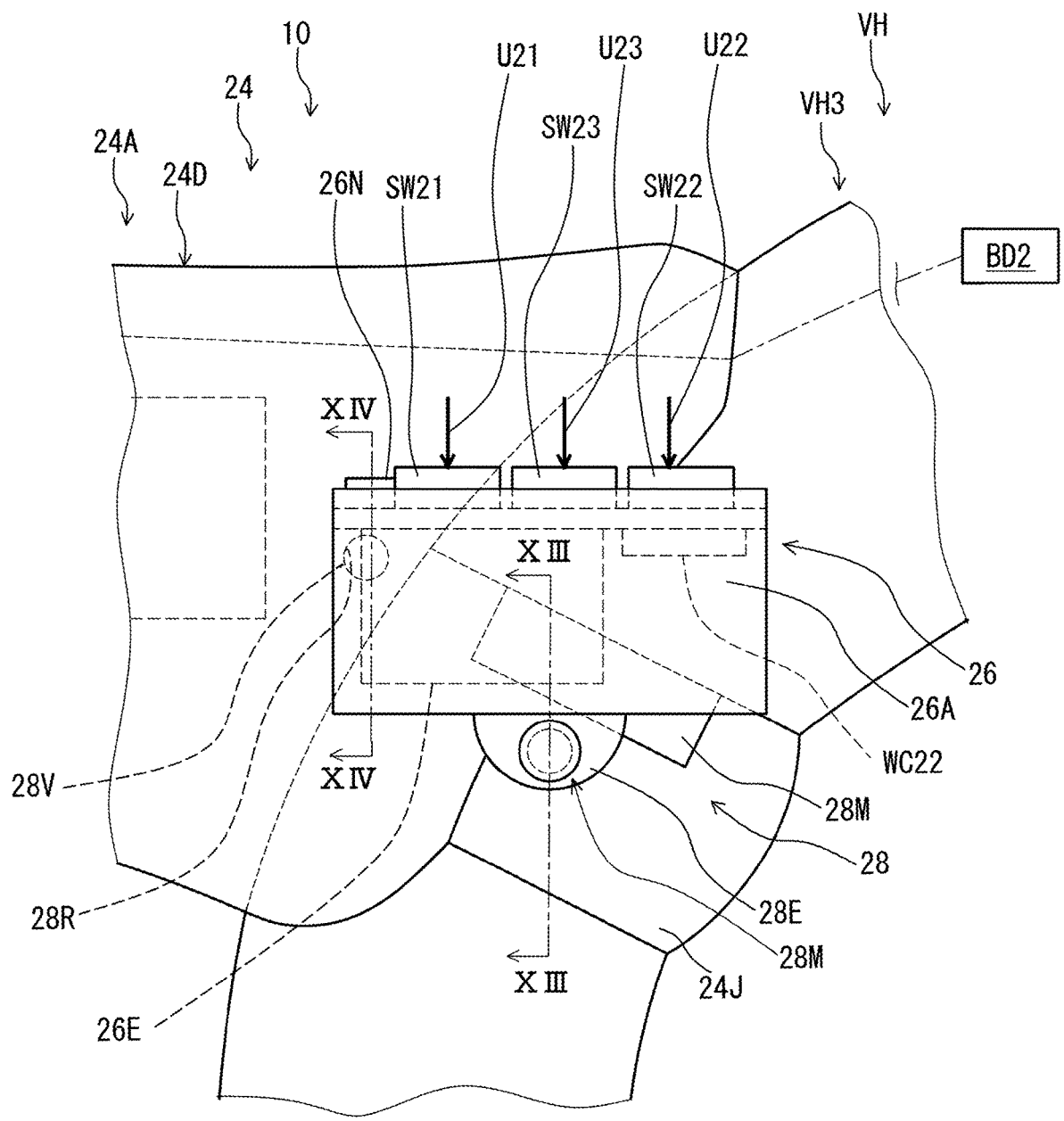
FIG. 12 is a partial side elevational view of the operating device and the operating switch device of the operating apparatus of the human-powered vehicle illustrated in FIG. 1.

As seen in FIG. 12, the operating switch device 26 for the human-powered vehicle VH comprises an assist operating switch SW21. The assist operating switch SW21 is configured to receive a user operation input U21 to operate the assist driving unit DU configured to assist a human power. The coupling structure 28 is configured to detachably couple the assist operating switch SW21 to the base member 24A of the operating device 24 configured to be mounted to the handlebar VH3. The operating switch device 26 further comprises an additional assist operating switch SW22. The additional assist operating switch SW22 is configured to receive an additional user operation input U22 to operate the assist driving unit DU. The operating switch device 26 further comprises an additional switch SW23 configured to receive an additional user input U23. The assist operating switch SW21 has substantially the same structure as the structure of the assist operating switch SW11. The additional assist operating switch SW22 has substantially the same structure as the structure of the additional assist operating switch SW12. The additional switch SW23 has substantially the same structure as the structure of the additional switch SW23. The description of the assist operating switch SW21 can be utilized as the description of the assist operating switch SW11 by replacing "SW11" and "U11" of the description with "SW21" and U21." The description of the additional assist operating switch SW22 can be utilized as the description of the additional assist operating switch SW22 by replacing "SW12" and "U12" of the description with "SW22" and "U22." The description of the additional switch SW23 can be utilized as the description of the additional switch SW13 by replacing the numeral reference "SW13" and "U13" of the description with "SW23" and "U23." Thus, they will not be described in detail here for the sake of brevity.

Figure 13:
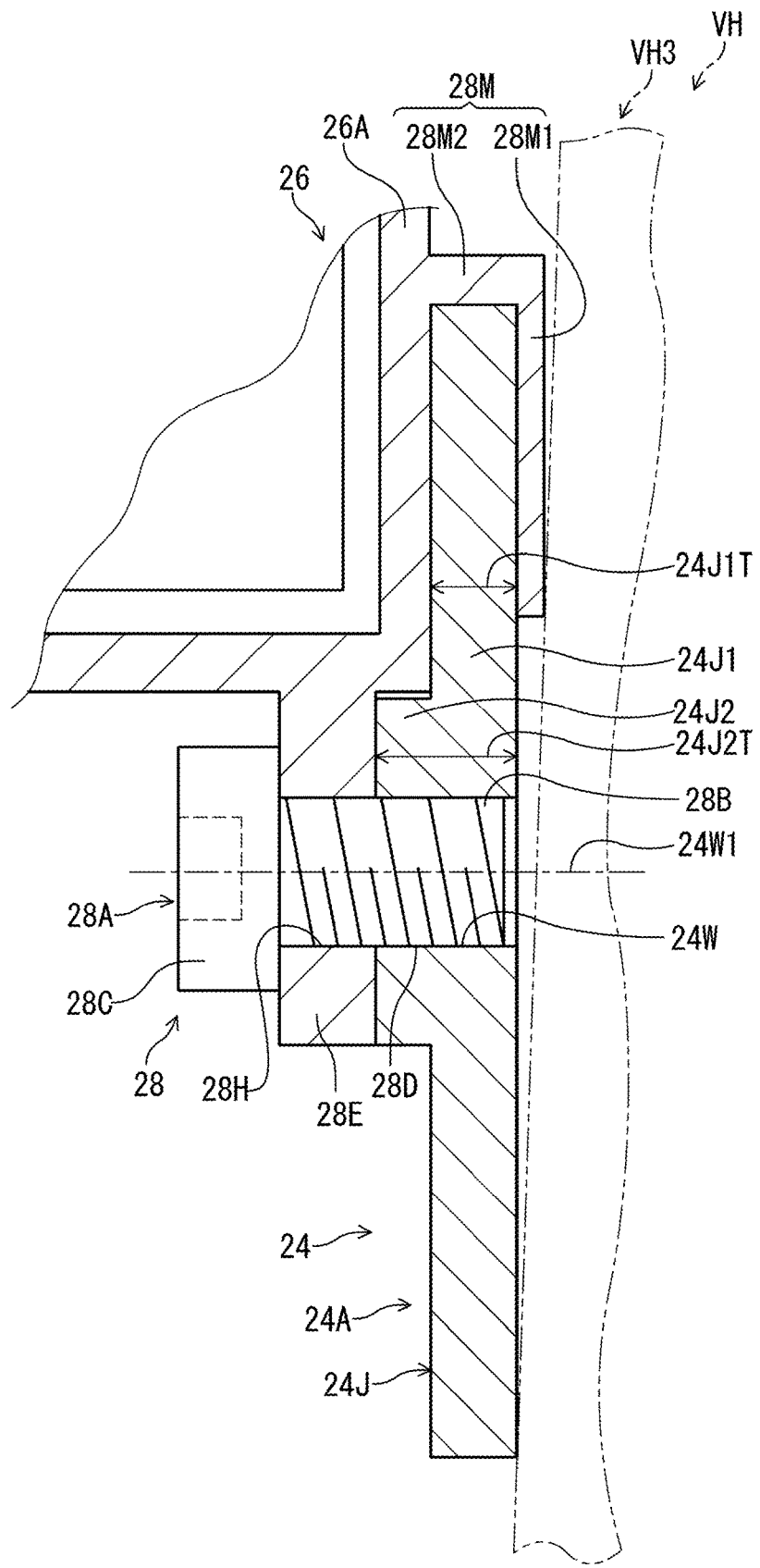
FIG. 13 is a cross-sectional view of the operating device and the operating switch device of the operating apparatus taken along line XIII-XIII of FIG. 12.
Figure 14:
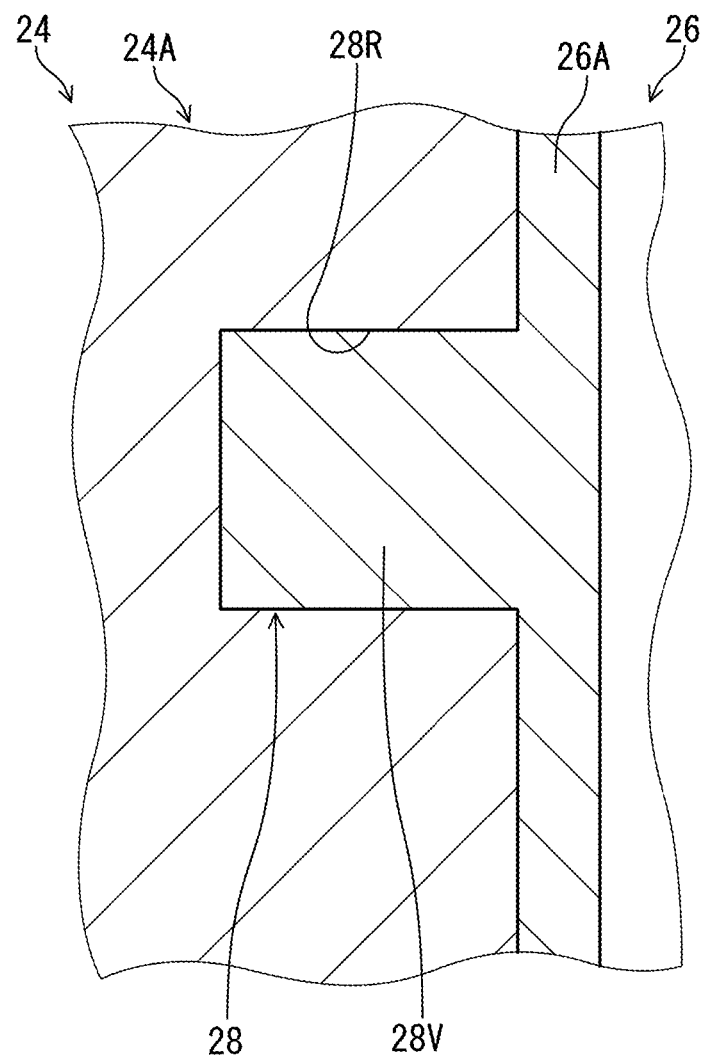
FIG. 14 is a cross-sectional view of the operating device and the operating switch device of the operating apparatus taken along line XIV-XIV of FIG. 12.

As seen in FIGS. 12 to 14, the operating switch device 26 for the human-powered vehicle VH comprises a coupling structure 28. The coupling structure 28 has substantially the same structure as the structure of the coupling structure 28. The description of the coupling structure 28 can be utilized as the description of the coupling structure 28 by replacing the numeral reference "18" of the description with "28."

As seen in FIG. 10, the operating device 24 includes a first electrical switch SW24 and a second electrical switch SW25. The first electrical switch SW24 is configured to receive a first user operation input U24 to operate an electric component. The second electrical switch SW25 is configured to receive a second user operation input U25 to operate an electric component. In this embodiment, the first electrical switch SW24 is configured to receive the first user operation input U24 indicating upshifting of the gear changing unit RD. The second electrical switch SW25 is configured to receive the second user operation input U25 indicating downshifting of the gear changing unit RD. However, the first electrical switch SW24 and the second electrical switch SW25 can be used to operate another electric component such as the gear changing unit FD, an adjustable seatpost, an internal gear hub, a front suspension, a rear suspension, a cycle computer, a smartphone, a tablet computer, or a light emitting device.

In this embodiment, the first electrical switch SW24 and the second electrical switch SW25 are mounted to the operating member 24B. However, the locations of the first electrical switch SW24 and the second electrical switch SW25 are not limited to this embodiment. At least one of the first electrical switch SW24 and the second electrical switch SW25 can be omitted from the operating device 24.

As seen in FIG. 9, the base member 24A includes an inner lateral surface 24Y and an outer lateral surface 24Z. The inner lateral surface 24Y is provided between the outer lateral surface 24Z and a center plane VH6 of the human-powered vehicle VH. In this embodiment, the operating switch device 26 is mounted on the inner lateral surface 24Y of the base member 24A. However, the location of the operating switch device 26 is not limited to this embodiment. The operating switch device 26 can be mounted on the outer lateral surface 24Z of the base member 24A.

As seen in FIG. 3, the operating device 14 includes a communicator 14K configured to transmit a control signal. The communicator 14K is configured to be electrically connected to the first electrical switch SW14 to transmit a first control signal CS14 in response to the first user operation input U14. The communicator 14K is configured to be electrically connected to the additional assist operating switch SW12 to transmit a second control signal CS15 in response to the second user operation input U15. The communicator 14K is configured to be electrically connected to the movement detector 14V to transmit a detection signal CS16 based on the detection result of the movement detector 14V.

The communicator 14K includes a wireless communicator WC11 configured to wirelessly transmit the signals CS14, CS15, and CS16. The wireless communicator WC11 is configured to wirelessly receive information. The wireless communicator WC11 is configured to be electrically connected to the first electrical switch SW14 to wirelessly transmit the first control signal CS14 in response to the user operation input U11. The wireless communicator WC11 is configured to be electrically connected to the second electrical switch SW15 to wirelessly transmit the second control signal CS15 in response to the second user operation input U15. The wireless communicator WC11 is configured to be electrically connected to the movement detector 14V to wirelessly transmit the detection signal CS16 based on the detection result of the movement detector 14V.

The communicator 14K includes a processor 14P, a memory 14M, a circuit board 14Q, and a system bus 14R. The processor 14P and the memory 14M are electrically mounted on the circuit board 14Q. The processor 14P includes a central processing unit (CPU) and a memory controller. The memory 14M is electrically connected to the processor 14P. The memory 14M includes a read only memory (ROM) and a random-access memory (RAM). The memory 14M includes storage areas each having an address in the ROM and the RAM. The processor 14P is configured to control the memory 14M to store data in the storage areas of the memory 14M and reads data from the storage areas of the memory 14M. The circuit board 14Q, the first electrical switch SW14, the second electrical switch SW15, and the movement detector 14V are electrically connected to the system bus 14R. The first electrical switch SW14, the second electrical switch SW15, the movement detector 14V are electrically connected to the processor 14P and the memory 14M with the circuit board 14Q and the system bus 14R. The memory 14M (e.g., the ROM) stores a program. The program is read into the processor 14P, and thereby the configuration and/or algorithm of the communicator 14K is performed.

The wireless communicator WC11 is electrically mounted on the circuit board 14Q. The wireless communicator WC11 is electrically connected to the processor 14P and the memory 14M with the circuit board 14Q and the system bus 14R. The wireless communicator WC11 includes a signal transmitting circuit, a signal receiving circuit, and an antenna. Thus, the wireless communicator WC11 can also be referred to as a wireless communication circuit WC11.

The wireless communicator WC11 is configured to superimpose a digital signal such as the signal CS14, CS15, or CS16 on carrier wave using a predetermined wireless communication protocol to wirelessly transmit the digital signal. In this embodiment, the wireless communicator WC11 is configured to encrypt a signal such as the signal CS14, CS15, or CS16 using a cryptographic key to generate encrypted wireless signals.

The wireless communicator WC11 is configured to receives a wireless signal via the antenna. In this embodiment, the wireless communicator WC11 is configured to decode the wireless signal to recognize signals and/or information wirelessly transmitted from another wireless communicator. The wireless communicator WC11 is configured to decrypt the wireless signal using the cryptographic key.

The operating device 14 includes an electric power source 14E. The electric power source 14E is configured to supply electricity to the communicator 14K. The electric power source 14E is configured to be electrically connected to the communicator 14K. In this embodiment, the electric power source 14E includes a battery 14T and a battery holder 14H. The battery 14T includes a replaceable and/or rechargeable battery. The battery holder 14H is configured to be electrically connected to the communicator 14K via the circuit board 14Q and the system bus 14R. The battery 14T is configured to be detachably attached to the battery holder 14H. However, the electric power source 14E is not limited to this embodiment. For example, the electric power source 14E can include another component such as a capacitor and an electricity generation element (e.g., a piezoelectric element) instead of or in addition to the battery 14T and the battery holder 14H.

The operating device 14 includes a notification device 14N. The notification device 14N is configured to notify a user of information relating to the operating device 14. For example, the notification device 14N is configured to notify a user of a remaining level of the battery 14T or a communication state of the communicator 14K. The notification device 14N is configured to be electrically connected to the communicator 14K. The notification device 14N includes a light emitting element. The communicator 14K is configured to turn the notification device 14N on based on the information.

As seen in FIG. 3, the operating switch device 16 includes a communicator 16K configured to transmit a control signal. The communicator 16K is configured to be electrically connected to the assist operating switch SW11 to generate and transmit an assist control signal CS11 in response to the user operation input U11. The communicator 16K is configured to be electrically connected to the additional assist operating switch SW12 to generate and transmit an additional assist control signal CS12 in response to the additional user operation input U12. The communicator 16K is configured to be electrically connected to the additional switch SW13 to generate and transmit an additional control signal CS13 in response to the additional user input U13.

The operating switch device 16 further comprises a wireless communicator WC12. The wireless communicator WC12 is configured to wirelessly transmit an assist control signal CS11 in response to the user operation input U11. The wireless communicator WC12 is configured to wirelessly transmit an additional assist control signal CS12 in response to the additional user operation input U12. The wireless communicator WC12 is configured to wirelessly transmit an additional control signal CS13 in response to the additional user input U13.

As seen in FIG. 6, the coupling structure 18 is configured to detachably couple the assist operating switch SW11 and the wireless communicator WC12 to the base member 14A. The wireless communicator WC12 is mounted to the switch base member 16A. The electric power source 16E is mounted to the switch base member 16A.

As seen in FIG. 3, the communicator 16K includes a processor 16P, a memory 16M, a circuit board 16Q, and a system bus 16R. The processor 16P and the memory 16M are electrically mounted on the circuit board 16Q. The processor 16P includes a central processing unit (CPU) and a memory controller. The memory 16M is electrically connected to the processor 16P. The memory 16M includes a read only memory (ROM) and a random-access memory (RAM). The memory 16M includes storage areas each having an address in the ROM and the RAM. The processor 16P is configured to control the memory 16M to store data in the storage areas of the memory 16M and reads data from the storage areas of the memory 16M. The circuit board 16Q, the assist operating switch SW11, the additional assist operating switch SW12, and the additional switch SW13 are electrically connected to the system bus 16R. The assist operating switch SW11, the additional assist operating switch SW12, and the additional switch SW13 are electrically connected to the processor 16P and the memory 16M with the circuit board 16Q and the system bus 16R. The memory 16M (e.g., the ROM) stores a program. The program is read into the processor 16P, and thereby the configuration and/or algorithm of the communicator 16K is performed.

The wireless communicator WC12 is electrically mounted on the circuit board 16Q. The wireless communicator WC12 is electrically connected to the processor 16P and the memory 16M with the circuit board 16Q and the system bus 16R. The wireless communicator WC12 includes a signal transmitting circuit, a signal receiving circuit, and an antenna. Thus, the wireless communicator WC12 can also be referred to as a wireless communication circuit WC12.

The wireless communicator WC12 is configured to superimpose a digital signal such as the signal CS11, CS12, or CS13 on carrier wave using a predetermined wireless communication protocol to wirelessly transmit the digital signal. In this embodiment, the wireless communicator WC12 is configured to encrypt a signal such as the signal CS11, CS12, or CS13 using a cryptographic key to generate encrypted wireless signals.

The wireless communicator WC12 is configured to receives a wireless signal via the antenna. In this embodiment, the wireless communicator WC12 is configured to decode the wireless signal to recognize signals and/or information wirelessly transmitted from another wireless communicator. The wireless communicator WC12 is configured to decrypt the wireless signal using the cryptographic key.

The operating switch device 16 includes an electric power source 16E. The electric power source 16E is configured to supply electricity to the communicator 16K. The electric power source 16E is configured to be electrically connected to the communicator 16K. In this embodiment, the electric power source 16E includes a battery 16T and a battery holder 16H. The battery 16T includes a replaceable and/or rechargeable battery. The battery holder 16H is configured to be electrically connected to the communicator 16K via the circuit board 16Q and the system bus 16R. The battery 16T is configured to be detachably attached to the battery holder 16H. However, the electric power source 16E is not limited to this embodiment. For example, the electric power source 16E can include another component such as a capacitor and an electricity generation element (e.g., a piezoelectric element) instead of or in addition to the battery 16T and the battery holder 16H.

The informing unit 16N is configured to be electrically connected to the communicator 16K. The informing unit 16N includes a light emitting element. The communicator 16K is configured to turn the informing unit 16N on based on the information.

Figure 15:
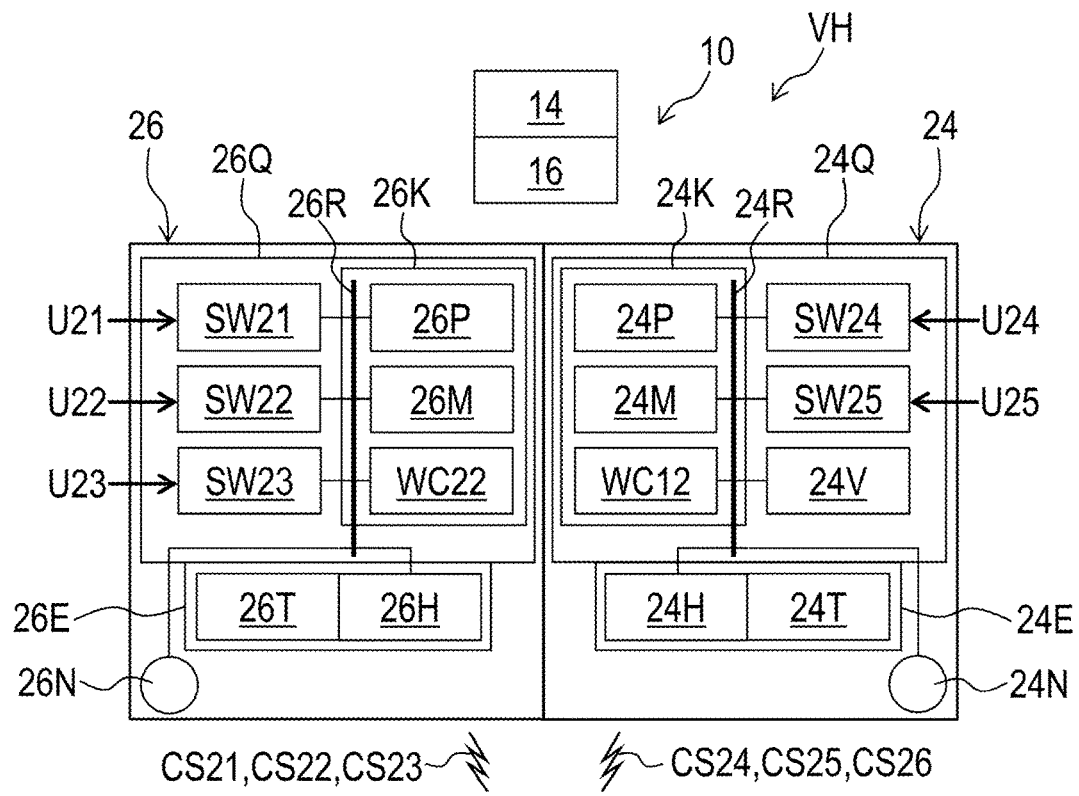
FIG. 15 is a schematic block diagram of the human-powered vehicle illustrated in FIG. 1.
Figure 15:
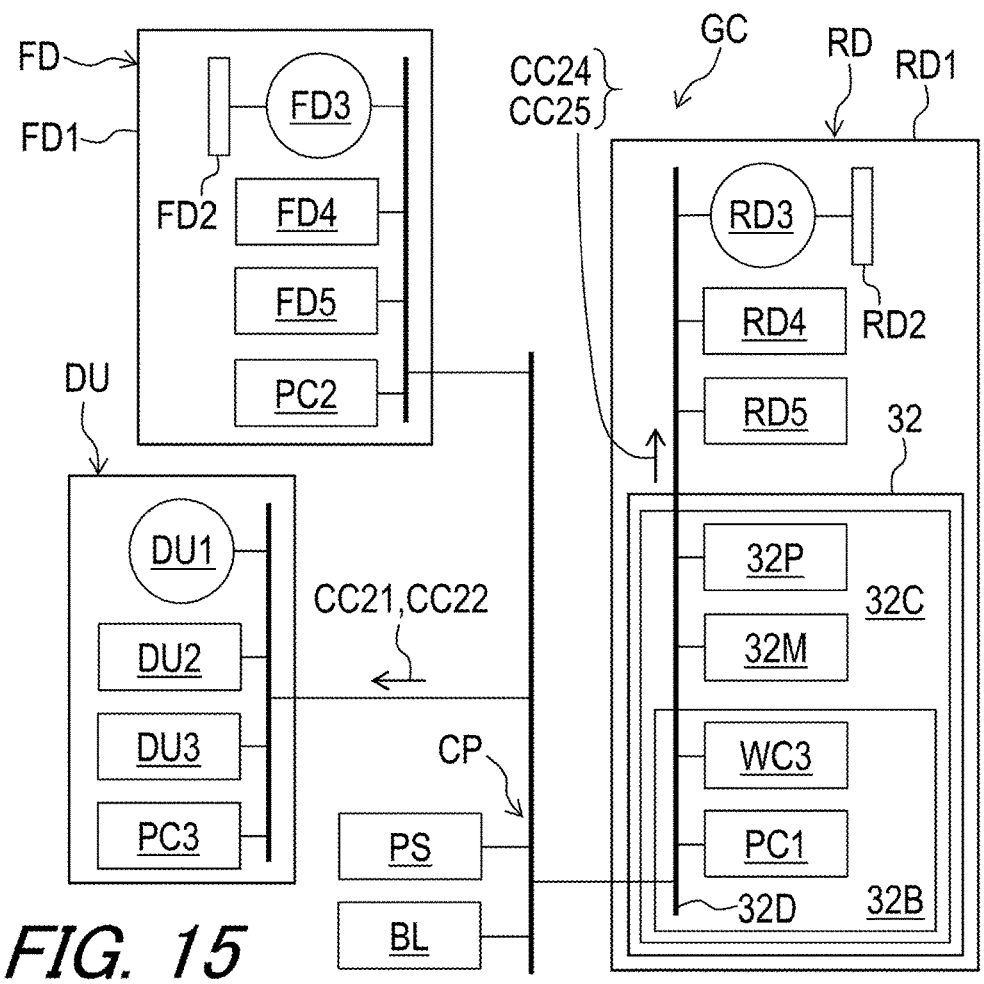

As seen in FIG. 15, the operating device 24 includes a communicator 24K configured to transmit a control signal. The communicator 24K is configured to be electrically connected to the first electrical switch SW24 to transmit a first control signal CS24 in response to the first user operation input U24. The communicator 24K is configured to be electrically connected to the second electrical switch SW25 to transmit a second control signal CS25 in response to the second user operation input U25. The communicator 24K is configured to be electrically connected to the movement detector 24V to transmit a detection signal CS26 based on the detection result of the movement detector 24V.

The communicator 24K includes a wireless communicator WC21 configured to wirelessly transmit the signals CS24, CS25, and CS26. The wireless communicator WC21 is configured to wirelessly receive information. The wireless communicator WC21 is configured to be electrically connected to the first electrical switch SW24 to wirelessly transmit the first control signal CS24 in response to the user operation input U21. The wireless communicator WC21 is configured to be electrically connected to the second electrical switch SW25 to wirelessly transmit the second control signal CS25 in response to the second user operation input U25. The wireless communicator WC21 is configured to be electrically connected to the movement detector 24V to wirelessly transmit the detection signal CS26 based on the detection result of the movement detector 24V.

The communicator 24K has substantially the same structure as the structure of the communicator 14K of the operating device 14. The wireless communicator WC21 has substantially the same structure as the structure of the wireless communicator WC11 of the operating device 14. Thus, the description of the communicator 14K can be utilized as the description of the communicator 24K by replacing "14," "CS14," "CS15," and "CS16" of the description with "24," "CS24," "CS25," and "CS26." The description of the wireless communicator WC11 can be utilized as the description of the wireless communicator WC21 by replacing "WC11," "CS14," "CS15," and "CS16" of the description with "WC21," "CS24," "CS25," and "CS26."

As seen in FIG. 15, the operating device 24 includes a communicator 24K configured to transmit a control signal. The communicator 24K is configured to be electrically connected to the assist operating switch SW21 to generate and transmit an assist control signal CS21 in response to the user operation input U21. The communicator 24K is configured to be electrically connected to the additional assist operating switch SW22 to generate and transmit an additional assist control signal CS22 in response to the additional user operation input U22. The communicator 24K is configured to be electrically connected to the additional switch SW23 to generate and transmit an additional control signal CS23 in response to the additional user input U23.

As seen in FIG. 15, the operating switch device 26 includes a communicator 26K configured to transmit a control signal. The communicator 26K is configured to be electrically connected to the assist operating switch SW21 to generate and transmit an assist control signal CS21 in response to the user operation input U21. The communicator 26K is configured to be electrically connected to the additional assist operating switch SW22 to generate and transmit an additional assist control signal CS22 in response to the additional user operation input U22. The communicator 26K is configured to be electrically connected to the additional switch SW23 to generate and transmit an additional control signal CS23 in response to the additional user input U23.

The operating switch device 26 further comprises a wireless communicator WC22. The wireless communicator WC22 is configured to wirelessly transmit an assist control signal CS21 in response to the user operation input U21. The wireless communicator WC22 is configured to wirelessly transmit an additional assist control signal CS22 in response to the additional user operation input U22. The wireless communicator WC22 is configured to wirelessly transmit an additional control signal CS23 in response to the additional user input U23.

As seen in FIG. 12, the coupling structure 28 is configured to detachably couple the assist operating switch SW21 and the wireless communicator WC22 to the base member 14A. The wireless communicator WC22 is mounted to the switch base member 26A. The electric power source 26E is mounted to the switch base member 26A.

The communicator 26K has substantially the same structure as the structure of the communicator 16K of the operating device 14. The wireless communicator WC21 has substantially the same structure as the structure of the wireless communicator WC11 of the operating device 14. Thus, the description of the communicator 16K can be utilized as the description of the communicator 26K by replacing "16," "CS11," "CS12," and "CS13" of the description with "26," "CS21," "CS22," and "CS23." The description of the wireless communicator WC12 can be utilized as the description of the wireless communicator WC22 by replacing "WC12," "CS11," "CS12," and "CS13" of the description with "WC22," "CS21," "CS22," and "CS23."

As seen in FIGS. 3 and 15, the operating apparatus 10 further comprises a controller 32. The controller 32 is configured to communicate with the operating device 14 and the operating switch device 16. In this embodiment, the controller 32 is configured to be mounted to the gear changing device GC. More specifically, the controller 32 is configured to be mounted to the gear changing unit RD. However, the controller 32 can be mounted to another device such as the operating device 14, the operating device 24, the gear changing unit FD, and the power supply PS.

The controller 32 includes a processor 32P, a memory 32M, a circuit board 32C, and a system bus 32D. The processor 32P and the memory 32M are electrically mounted on the circuit board 32C. The processor 32P includes a CPU and a memory controller. The memory 32M is electrically connected to the processor 32P. The memory 32M includes a ROM and a RAM. The memory 32M includes storage areas each having an address in the ROM and the RAM. The processor 32P is configured to control the memory 32M to store data in the storage areas of the memory 32M and reads data from the storage areas of the memory 32M. The memory 32M (e.g., the ROM) stores a program. The program is read into the processor 32P, and thereby the configuration and/or algorithm of the communicator 32B is performed.

As seen in FIGS. 3 and 15, the controller 32 includes a communicator 32B. The communicator 32B is configured to communicate with the communicators 14K, 16K, 24K, and 26K. As seen in FIG. 3, the controller 32 is configured to receive the assist control signal CS11, the additional assist control signal CS12, and the additional control signal CS13 from the operating switch device 16. The controller 32 is configured to receive the first control signal CS14, the second control signal CS15, and the detection signal CS16 from the operating device 14. As seen in FIG. 15, the controller 32 is configured to receive the assist control signal CS21, the additional assist control signal CS22, and the additional control signal CS23 from the operating switch device 26. The controller 32 is configured to receive the first control signal CS24, the second control signal CS25, and the detection signal CS26 from the operating device 24.

In this embodiment, the communicator 32B includes a wireless communicator WC3 configured to wirelessly receive signals or other information from the wireless communicators WC11, WC12, WC21, and WC22. The wireless communicator WC3 is configured to wirelessly receive signals (e.g., the control signals CS11 to CS16 and CS21 to CS26) or other information from the wireless communicators WC11, WC12, WC21, and WC22. The wireless communicator WC3 has substantially the same structure as the structures of the wireless communicators WC11, WC12, WC21, and WC22. Thus, it will not be described in detail here for the sake of brevity.

As seen in FIG. 3, the controller 32 is configured to generate an assist control command CC11 based on the assist control signal CS11. The controller 32 is configured to generate an additional assist control command CC12 based on the additional assist control signal CS12. The controller 32 is configured to generate an additional control command CC13 based on the additional control signal CS13. The controller 32 is configured to generate a first control command CC based on the first control signal CS14. The controller 32 is configured to generate a second control command CC15 based on the second control signal CS15. Thus, the controller 32 is configured to generate the assist control command CC11 based on the user operation input U11. The controller 32 is configured to generate the additional assist control command CC12 based on the additional user operation input U12. The controller 32 is configured to generate the additional control command CC13 based on the additional user input U13. The controller 32 is configured to generate the first control command CC14 based on the first user operation input U14. The controller 32 is configured to generate the second control command CC15 based on the second user operation input U15.

As seen in FIG. 15, the controller 32 is configured to generate an assist control command CC21 based on the assist control signal CS21. The controller 32 is configured to generate an additional assist control command CC22 based on the additional assist control signal CS22. The controller 32 is configured to generate an additional control command CC23 based on the additional control signal CS23. The controller 32 is configured to generate a first control command CC24 based on the first control signal CS24. The controller 32 is configured to generate a second control command CC25 based on the second control signal CS25. Thus, the controller 32 is configured to generate the assist control command CC21 based on the user operation input U21. The controller 32 is configured to generate the additional assist control command CC22 based on the additional user operation input U22. The controller 32 is configured to generate the additional control command CC23 based on the additional user input U23. The controller 32 is configured to generate the first control command CC24 based on the first user operation input U24. The controller 32 is configured to generate the second control command CC25 based on the second user operation input U25.

As seen in FIG. 3, the controller 32 is configured to control the assist driving unit DU to change the assist driving force generated by the assist driving unit DU based on the user operation input U11 and the additional user operation input U12. In this embodiment, the controller 32 is configured to control the assist driving unit DU to increase the assist driving force based on the user operation input U11. The controller 32 is configured to control the assist driving unit DU to decrease the assist driving force based on the additional user operation input U12. In this embodiment, the controller 32 is configured to control the assist driving unit DU to increase the assist driving force based on the assist control signal CS11. The controller 32 is configured to control the assist driving unit DU to decrease the assist driving force based on the additional assist control signal CS12.

The controller 32 is configured to control the gear changing device GC to change the gear ratio of the gear changing device GC based on the first user operation input U14 and the second user operation input U15. In this embodiment, the controller 32 is configured to control the gear changing unit FD to increase the gear ratio of the gear changing unit FD based on the first user operation input U14. The controller 32 is configured to control the gear changing unit FD to decrease the gear ratio of the gear changing unit FD based on the second user operation input U15. More specifically, the controller 32 is configured to control the gear changing unit FD to increase the gear ratio of the gear changing device GC based on the first control signal CS14. The controller 32 is configured to control the gear changing unit FD to decrease the gear ratio of the gear changing device GC based on the second control signal CS15.

However, the first user operation input U14, the first control signal CS14, and the first control command CC14 can indicate downshifting of the gear changing unit FD, or another command to operate another electric component such as the gear changing unit RD, the assist driving unit DU, an adjustable seatpost, an internal gear hub, a front suspension, a rear suspension, a cycle computer, a smartphone, a tablet computer, or a light emitting device. The second user operation input U15, the second control signal CS15, and the second control command CC15 can indicate upshifting of the gear changing unit FD, or another command to operate another electric component such as the gear changing unit RD, the assist driving unit DU, an adjustable seatpost, an internal gear hub, a front suspension, a rear suspension, a cycle computer, a smartphone, a tablet computer, or a light emitting device.

As seen in FIG. 15, the controller 32 is configured to control the assist driving unit DU to change the assist driving force generated by the assist driving unit DU based on the user operation input U21 and the additional user operation input U22. In this embodiment, the controller 32 is configured to control the assist driving unit DU to increase the assist driving force based on the user operation input U21. The controller 32 is configured to control the assist driving unit DU to decrease the assist driving force based on the additional user operation input U22. In this embodiment, the controller 32 is configured to control the assist driving unit DU to increase the assist driving force based on the assist control signal CS21. The controller 32 is configured to control the assist driving unit DU to decrease the assist driving force based on the additional assist control signal CS22.

The controller 32 is configured to control the gear changing device GC to change the gear ratio of the gear changing device GC based on the first user operation input U24 and the second user operation input U25. In this embodiment, the controller 32 is configured to control the gear changing unit RD to increase the gear ratio of the gear changing unit RD based on the first user operation input U24. The controller 32 is configured to control the gear changing unit RD to decrease the gear ratio of the gear changing unit RD based on the second user operation input U25. More specifically, the controller 32 is configured to control the gear changing unit RD to increase the gear ratio of the gear changing device GC based on the first control signal CS24. The controller 32 is configured to control the gear changing unit RD to decrease the gear ratio of the gear changing device GC based on the second control signal CS25.

However, the first user operation input U24, the first control signal CS24, and the first control command CC24 can indicate downshifting of the gear changing unit RD, or another command to operate another electric component such as the gear changing unit FD, the assist driving unit DU, an adjustable seatpost, an internal gear hub, a front suspension, a rear suspension, a cycle computer, a smartphone, a tablet computer, or a light emitting device. The second user operation input U25, the second control signal CS25, and the second control command CC25 can indicate upshifting of the gear changing unit RD, or another command to operate another electric component such as the gear changing unit FD, the assist driving unit DU, an adjustable seatpost, an internal gear hub, a front suspension, a rear suspension, a cycle computer, a smartphone, a tablet computer, or a light emitting device.

As seen in FIGS. 3 and 15, the motor controller DU3 is configured to control the assist motor DU1 to increase the assist driving force of the assist motor DU1 based on the assist control command CC11 or CC21. The motor controller DU3 is configured to control the assist motor DU1 to decrease the assist driving force of the assist motor DU1 based on the additional assist control command CC12 or CC22.

The motor controller DU3 is configured to store a plurality of assist ratios. For example, the plurality of assist ratios includes a first assist ratio, a second assist ratio, and a third assist ratio. The first assist ratio is lower than the second assist ratio. The third assist ratio is higher than the second assist ratio. The motor controller DU3 is configured to calculate an assist driving force based on the selected assist ratio and the pedaling force sensed by the pedaling-force sensor DU2. The motor controller DU3 is configured to control the assist motor DU1 to apply the calculated assist driving force to the drive train VH5.

The motor controller DU3 is configured to select one of the first to third assist ratios based on the control commands CC11, CC12, CC21, and CC22. The motor controller DU3 is configured to select an assist ratio higher than the current assist ratio by one step in response to the assist control command CC11 or CC21. The motor controller DU3 is configured to select an assist ratio lower than the current assist ratio by one step in response to the additional assist control command CC12 or CC22. For example, the motor controller DU3 is configured to select the second assist ratio in response to the assist control command CC11 or CC21 when the current assist ratio is the first assist ratio. The motor controller DU3 is configured to select the third assist ratio in response to the assist control command CC11 or CC21 when the current assist ratio is the second assist ratio. The motor controller DU3 is configured to select the second assist ratio in response to the additional assist control command CC12 or CC22 when the current assist ratio is the third assist ratio. The motor controller DU3 is configured to select the first assist ratio in response to the additional assist control command CC12 or CC22 when the current assist ratio is the second assist ratio.

As seen in FIG. 15, the gear changing unit RD includes a base member RD1, a chain guide RD2, an actuator RD3, a position sensor RD4, and an actuator driver RD5. The base member RD1 is mounted to the vehicle body VH1 (see e.g., FIG. 1). The chain guide RD2 is configured to guide the chain C. The chain guide RD2 is movably coupled to the base member RD1 and is configured to engage with the chain C when shifting the chain C relative to the rear sprocket assembly RS. The actuator RD3 is configured to move the chain guide RD2 relative to the base member RD1 to shift the chain C relative to the rear sprocket assembly RS. Examples of the actuator RD3 include a direct current motor and a stepper motor.

The actuator driver RD5 is electrically connected to the actuator RD3 to control the actuator RD3 based on the first control command CC24 and the second control command CC25 generated by the controller 32. Examples of the actuator RD3 include a direct-current (DC) motor and a stepper motor. The actuator RD3 includes a rotational shaft operatively coupled to the chain guide RD2. The position sensor RD4 is configured to sense a current gear position of the gear changing unit RD. Examples of the position sensor RD4 include a potentiometer and a rotary encoder. The position sensor RD4 is configured to sense an absolute rotational position of the rotational shaft of the actuator RD3 as the current gear position of the gear changing unit RD. The actuator RD3 and the position sensor RD4 are electrically connected to the actuator driver RD5.

The actuator driver RD5 is configured to control the actuator RD3 to move the chain guide RD2 relative to the base member RD1 by one gear position in an upshift direction based on the first control command CC24 and the current gear position sensed by the position sensor RD4. The actuator driver RD5 is configured to control the actuator RD3 to move the chain guide RD2 relative to the base member RD1 by one gear position in a downshift direction based on the second control command CC25 and the current gear position sensed by the position sensor RD4.

As seen in FIG. 15, the gear changing unit FD includes a base member FD1, a chain guide FD2, an actuator FD3, a position sensor FD4, and an actuator driver FD5. The base member FD1 is mounted to the vehicle body VH1 (see e.g., FIG. 1). The chain guide RD2 is configured to guide the chain C. The chain guide FD2 is movably coupled to the base member FD1 and is configured to contact the chain C when shifting the chain C relative to the front sprocket assembly FS. The actuator FD3 is configured to move the chain guide FD2 relative to the base member FD1 to shift the chain C relative to the front sprocket assembly FS. Examples of the actuator FD3 include a direct current motor and a stepper motor.

The actuator driver FD5 is electrically connected to the actuator FD3 to control the actuator FD3 based on the first control command CC14 and the second control command CC15 generated by the controller 32. Examples of the actuator FD3 include a direct-current (DC) motor and a stepper motor. The actuator FD3 includes a rotational shaft operatively coupled to the chain guide FD2. The position sensor FD4 is configured to sense a current gear position of the gear changing unit FD. Examples of the position sensor FD4 include a potentiometer and a rotary encoder. The position sensor FD4 is configured to sense an absolute rotational position of the rotational shaft of the actuator FD3 as the current gear position of the gear changing unit FD. The actuator FD3 and the position sensor FD4 are electrically connected to the actuator driver FD5.

The actuator driver FD5 is configured to control the actuator FD3 to move the chain guide FD2 relative to the base member FD1 by one gear position in an upshift direction based on the first control command CC14 and the current gear position sensed by the position sensor FD4. The actuator driver FD5 is configured to control the actuator FD3 to move the chain guide FD2 relative to the base member FD1 by one gear position in a downshift direction based on the second control command CC15 and the current gear position sensed by the position sensor FD4.

As seen in FIGS. 3 and 15, the controller 32, the assist driving unit DU, the gear changing unit FD, and the gear changing unit RD communicate with each other via the electric communication path CP using power line communication (PLC) technology. More specifically, each of the electric cables of the electric communication path CP includes a ground line and a voltage line that are detachably connected to a serial bus that is formed by communication interfaces and the junction. In this embodiment, the controller 32, the gear changing unit RD, the gear changing unit FD, and the assist driving unit DU can all communicate with each other through the voltage line using the PLC technology.

The control commands CC11, CC12, CC21, and CC22 are transmitted from the controller 32 to the assist driving unit DU through the electric communication path CP. The control commands CC13 and CC14 are transmitted from the controller 32 to the gear changing unit FD through the electric communication path CP. However, the assist driving unit DU can include a wireless communicator configured to wirelessly receive the assist control signal CS11, the additional assist control signal CS12, the assist control signal CS21, and the additional assist control signal CS22 from the operating apparatus 10. The gear changing unit FD can include a wireless communicator configured to wirelessly receive the first control signal CS14 and the second control signal CS15 from the operating apparatus 10. The assist driving unit DU can include a wireless communicator configured to wirelessly receive the control commands CC11, CC12, CC21, and CC22 from the operating apparatus 10. In such embodiment, the electric communication path CP can be omitted from the human-powered vehicle VH. The assist driving unit DU can use the power supply PS, and each of the gear changing unit FD and the gear changing unit RD can include another power supply.

The PLC technology is used for communicating between electric components. The PLC carries data on a conductor that is also used simultaneously for electric power transmission or electric power distribution to the electric components. In this embodiment, electricity is supplied from the power supply PS to the gear changing unit FD and the gear changing unit RD via the electric communication path CP. Furthermore, the controller 32 can receive information signals from the assist driving unit DU, the gear changing unit RD, the gear changing unit FD, and the power supply PS through the electric communication path CP using the PLC.

The PLC uses unique identifying information such as a unique identifier that is assigned to each of the assist driving unit DU, the gear changing unit FD, the gear changing unit RD, and the power supply PS. Each of the electric components DU, FD, RD, and PS includes a memory in which the unique identifying information is stored. Based on the unique identifying information, each of the electric components DU, FD, RD, and PS is configured to recognize, based on the unique identifying information, information signals which are necessary for itself among information signals transmitted via the electric communication path CP. For example, the controller 32 is configured to recognize information signals transmitted from the assist driving unit DU, the gear changing unit FD, the gear changing unit RD, and the power supply PS with the electric communication path CP. Instead of using the PLC technology, however, separate signal wires can be provided for transmitting data in addition to the ground wire and the voltage wire if needed and/or desired.

The communicator 32B includes a PLC controller PC1. The PLC controller PC1 is connected to the electric communication path CP, the gear changing unit RD, and the system bus 32D. The PLC controller PC is configured to separate input signals to a power source voltage and control signals. The PLC controller PC1 is configured to regulate the power source voltage to a level at which the controller 32 and the gear changing unit RD can properly operate. The PLC controller PC1 is further configured to superimpose output signals such as the assist control command CC21 and the additional assist control command CC22 on the power source voltage applied to the electric communication path CP from the power supply PS. The memory 32M is configured to store the unique identifying information of the controller 32 and the gear changing unit RD.

The gear changing unit FD includes a PLC controller PC2. The assist driving unit DU includes a PLC controller PC3. The PLC controllers PC2 and PC3 have substantially the same structure as the structure of the PLC controller PC1. Thus, they will not be described in detail for the sake of brevity.

The controller 32 is configured to be electrically connected to the brake lamp BL. The controller 32 is configured to control the brake lamp BL. The controller 32 is configured to turn the brake lamp BL on while the controller 32 receives the detection signal CS16 and/or the detection signal CS26. The controller 32 is configured to turn the brake lamp BL off while the controller 32 does not receive both the detection signal CS16 and/or the detection signal CS26.

Second Embodiment

An operating apparatus 210 in accordance with a second embodiment will be described below referring to FIGS. 16 and 17. The operating apparatus 210 has the same structure and/or configuration as those of the operating apparatus 10 except for the operating switch device 16 and the operating device 14. Thus, elements having substantially the same function as those in the first embodiment will be numbered the same here and will not be described and/or illustrated again in detail here for the sake of brevity.

Figure 16:
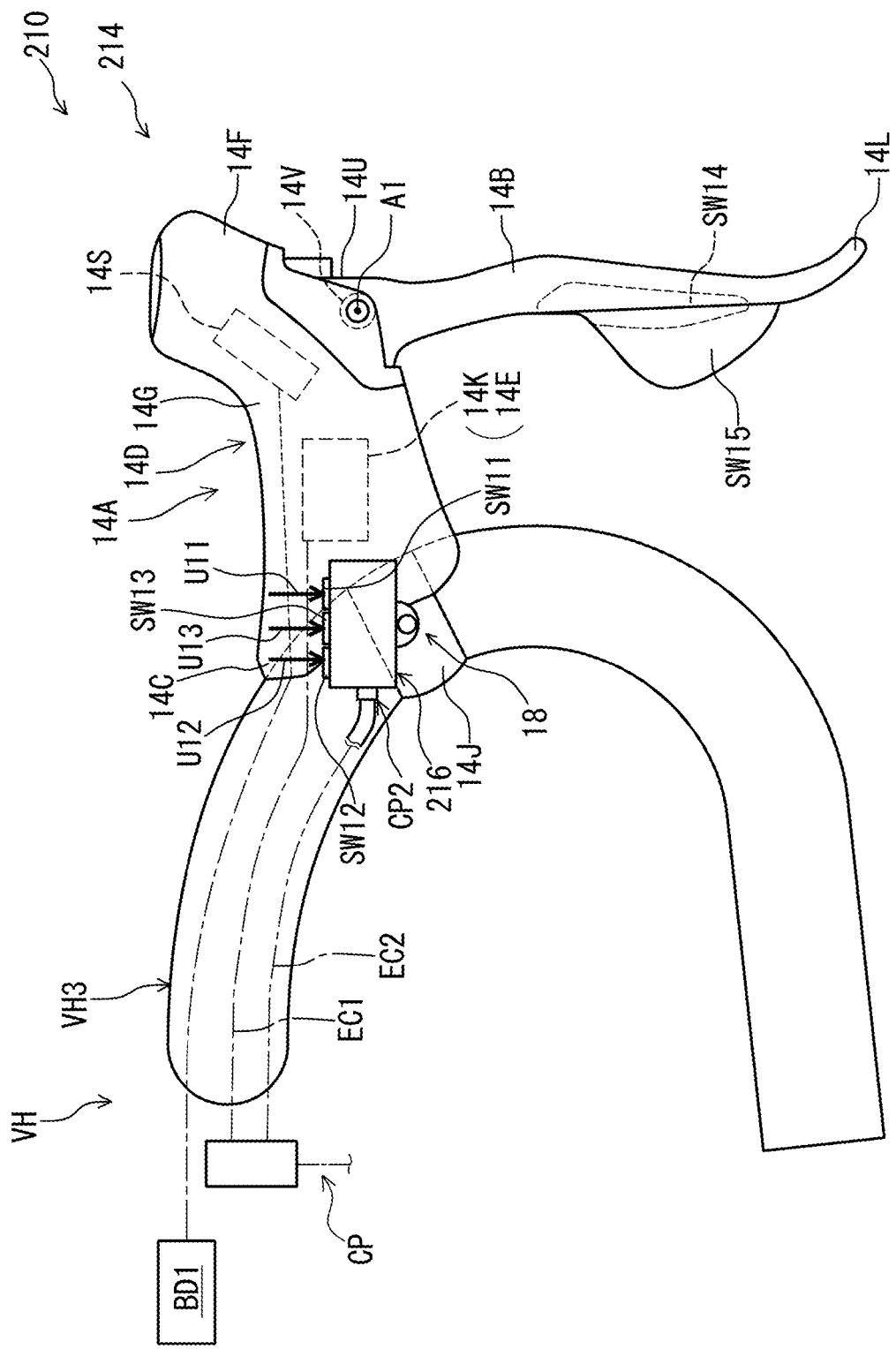
FIG. 16 is a side elevational view of an operating device and an operating switch device of an operating apparatus in accordance with a second embodiment.

As seen in FIG. 16, an operating apparatus 210 for the human-powered vehicle VH comprises an operating switch device 216 and an operating device 214. The operating switch device 216 for the human-powered vehicle VH comprises the assist operating switch SW11 and the coupling structure 18. The operating switch device 216 has substantially the same structure as the structure of the operating switch device 16 of the first embodiment. The operating device 214 has substantially the same structure as the structure of the operating device 14 of the first embodiment.

In this embodiment, the operating switch device 216 further comprises a communication port CP2. The communication port CP2 is configured to be connected to an electric cable EC2. The communication port CP2 is configured to be detachably connected to the electric cable EC2. The coupling structure 18 is configured to detachably couple the assist operating switch SW11 and the communication port CP2 to the base member 14A.

Figure 17:
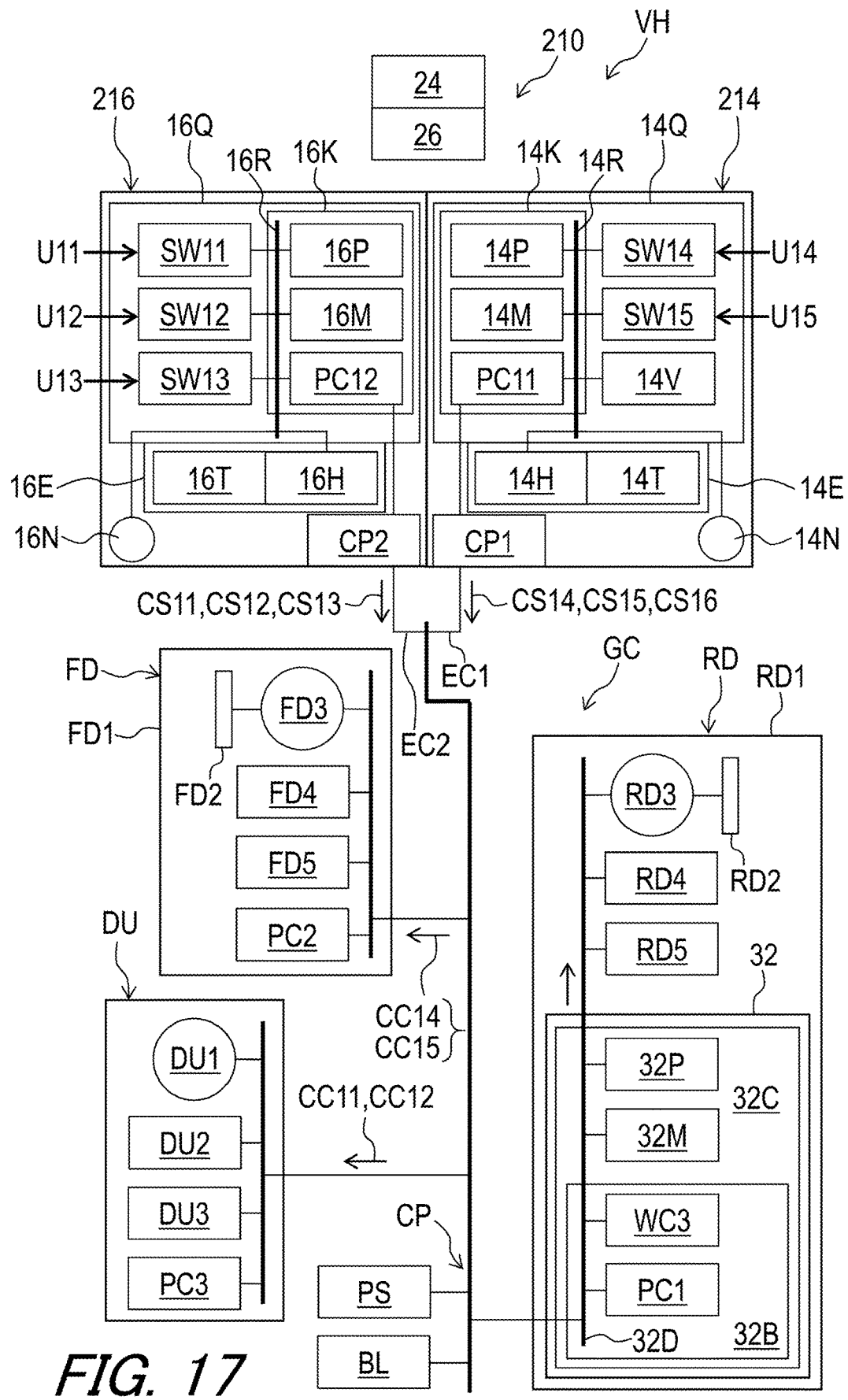
FIG. 17 is a schematic block diagram of the human-powered vehicle illustrated in FIG. 16.

As seen in FIG. 17, the operating device 214 further comprises a communication port CP1. The communication port CP1 is configured to be connected to an electric cable EC1. The communication port CP1 is configured to be detachably connected to the electric cable EC1.

The operating device 214 includes a PLC controller PC11 electrically connected to the communication port CP1. The operating switch device 216 includes a PLC controller PC12 electrically connected to the communication port CP2. Instead, the wireless communicator WC11 is omitted from the operating device 14. The wireless communicator WC12 is omitted from the operating switch device 16. The PLC controllers PC11 and PC12 have substantially the same structure as the structure of the PLC controller PC1. Thus, they will not be described in detail for the sake of brevity.

The above structure of the operating switch device 216 can apply to the operating switch device 26 of the first embodiment. The above structure of the operating device 214 can apply to the operating device 24 of the first embodiment.

Third Embodiment

An operating apparatus 310 in accordance with a second embodiment will be described below referring to FIGS. 18 and 19. The operating apparatus 310 has the same structure and/or configuration as those of the operating apparatus 10 except for the operating switch device 16 and the operating device 14. Thus, elements having substantially the same function as those in the above embodiments will be numbered the same here and will not be described and/or illustrated again in detail here for the sake of brevity.

Figure 18:
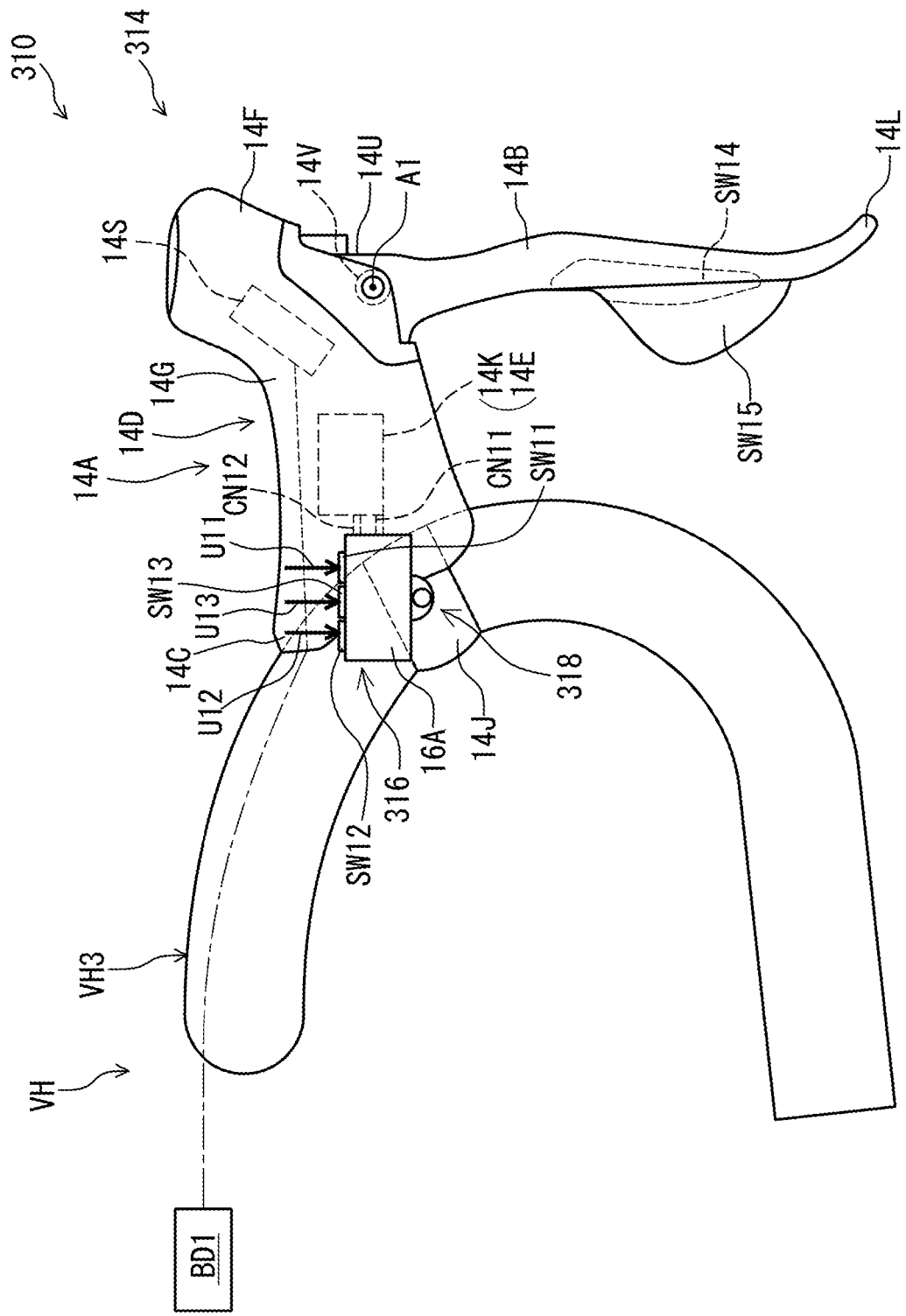
FIG. 18 is a side elevational view of an operating device and an operating switch device of an operating apparatus in accordance with a third embodiment.

As seen in FIG. 18, an operating apparatus 310 for the human-powered vehicle VH comprises an operating switch device 316 and an operating device 314. The operating switch device 316 for the human-powered vehicle VH comprises the assist operating switch SW11 and a coupling structure 318. The operating switch device 316 has substantially the same structure as the structure of the operating switch device 16 of the first embodiment. The operating device 314 has substantially the same structure as the structure of the operating device 14 of the first embodiment.

In this embodiment, the coupling structure 318 includes a first connector CN11 configured to be electrically connected to a second connector CN12 of the base member 14A. The first connector CN11 is configured to detachably couple the assist operating switch SW11 to the second connector CN12. In this embodiment, the first connector CN11 is mounted to the switch base member 16A. The second connector CN12 is mounted to the base member 14A.

Figure 19:
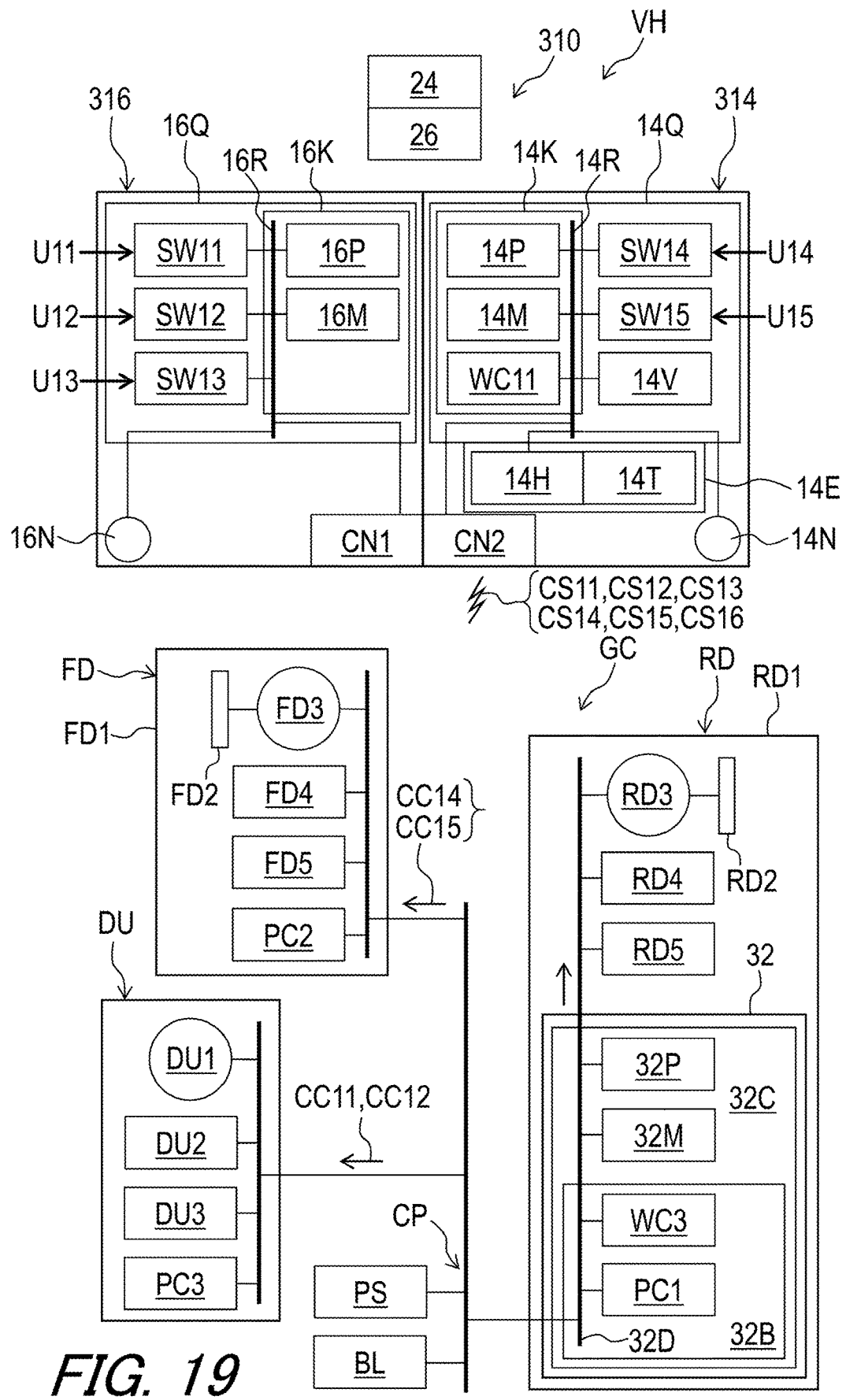
FIG. 19 is a schematic block diagram of the human-powered vehicle illustrated in FIG. 18.

As seen in FIG. 19, the first connector CN11 is electrically connected to the communicator 16K. The second connector CN12 is electrically connected to the communicator 14K. The operating switch device 316 is electrically connected to the operating device 314 through the first connector CN11 and the second connector CN12. The operating switch device 316 is configured to share the wireless communicator WC1 and the electric power source 14E of the operating device 314. The wireless communicator WC1 is configured to wirelessly transmit the assist control signal CS11, the additional assist control signal CS12, and the additional control signal CS13 based on the user operation input U11, the additional user operation input U12, and the additional user input U13.

The above structure of the operating switch device 316 can apply to the operating switch device 26 of the first embodiment. The above structure of the operating device 314 can apply to the operating device 24 of the first embodiment.

Fourth Embodiment

An operating apparatus 410 in accordance with a second embodiment will be described below referring to FIG. 20. The operating apparatus 410 has the same structure and/or configuration as those of the operating apparatus 10 except for the operating switch device 16 and the operating device 14. Thus, elements having substantially the same function as those in the above embodiments will be numbered the same here and will not be described and/or illustrated again in detail here for the sake of brevity.

Figure 20:
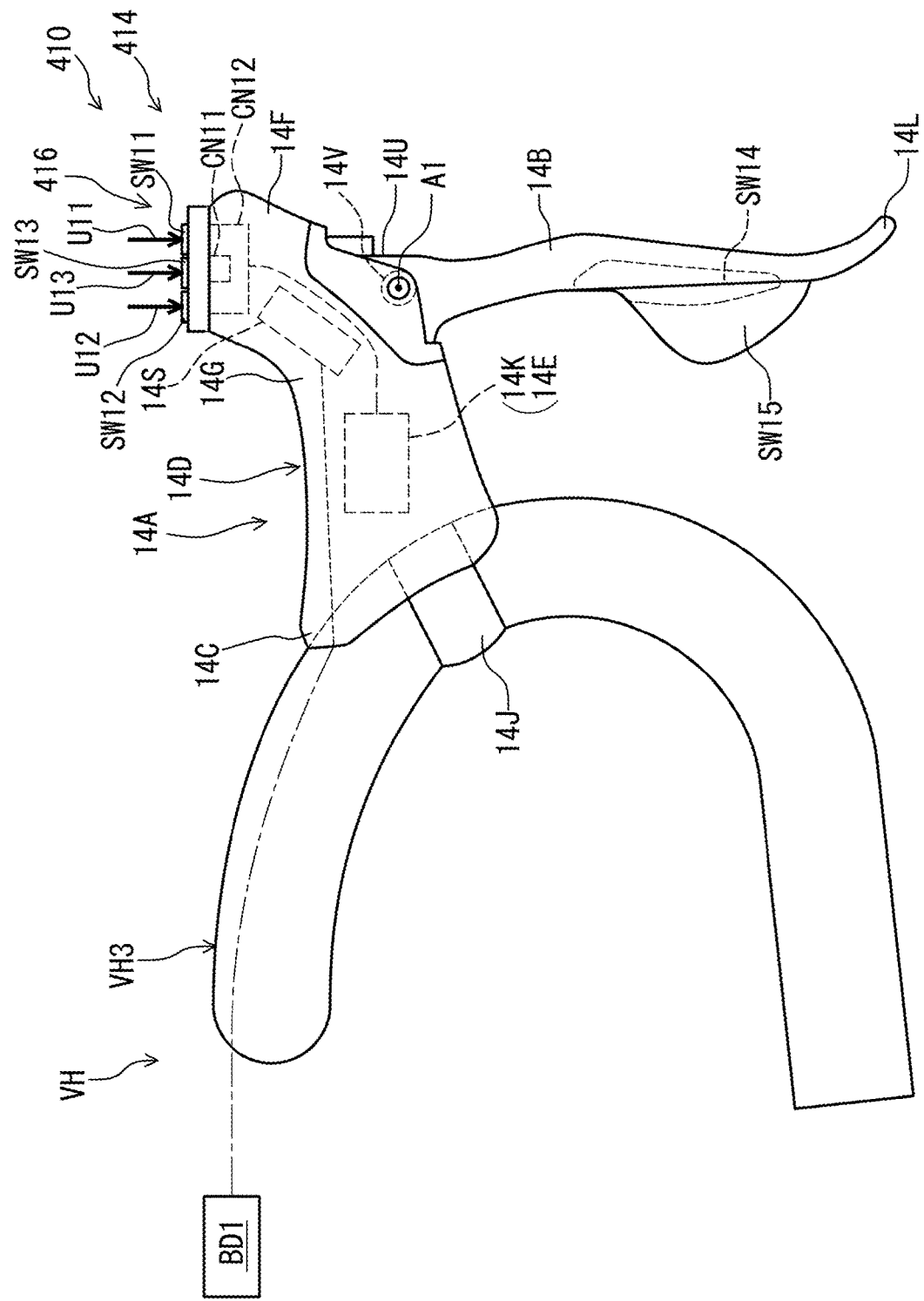
FIG. 20 is a side elevational view of an operating device and an operating switch device of an operating apparatus in accordance with a fourth embodiment.

As seen in FIG. 20, an operating apparatus 410 for the human-powered vehicle VH comprises an operating switch device 416 and an operating device 414. The operating switch device 416 for the human-powered vehicle VH comprises the assist operating switch SW11 and a coupling structure 418. The operating switch device 416 has substantially the same structure as the structure of the operating switch device 316 of the third embodiment. The operating device 414 has substantially the same structure as the structure of the operating device 314 of the third embodiment.

The coupling structure 418 includes the first connector CN11 configured to be electrically connected to the second connector CN12 of the base member 14A. The first connector CN11 is configured to detachably couple the assist operating switch SW11 to the second connector CN12. In this embodiment, the fastener 18A, the convex portion 18V, the recess 18R, and the intermediate part 18M are omitted from the coupling structure 418.

The above structure of the operating switch device 416 can apply to the operating switch device 26 of the first embodiment. The above structure of the operating device 414 can apply to the operating device 24 of the first embodiment.

Modifications

In the above embodiments, the operating apparatus 10 includes the operating switch device 16 and the operating switch device 26. However, one of the operating switch device 16 and the operating switch device 26 can be omitted from the operating apparatus 10. The same modification can apply to the second to fourth embodiments.

In the above embodiments and the above modification, the coupling structure 18 includes the fastener 18A, the coupled part 18E, the convex portion 18V, the recess 18R, and the intermediate part 18M. However, at least one of the fastener 18A, the convex portion 18V, the recess 18R, and the intermediate part 18M can be omitted from the coupling structure 18. The coupled part 18E can be omitted from the coupling structure 18 if the coupling structure 18 includes the intermediate part 18M. The same modification can apply to the coupling structure 28, the second to fourth embodiments, and the above modification. Furthermore, the structures of the fastener 18A, the convex portion 18V, the recess 18R, and the intermediate part 18M are not limited to this embodiment. For example, the fastener 18A can have other structures such as a snap-fit, and a bolt and a nut. The same modification can apply to the coupling structure 28, the second to fourth embodiments, and the above modification.

In the above embodiments and the above modifications, each of the operating switch devices 16, 216, 316, and 416 includes the additional assist operating switch SW12 and the additional switch SW13. However, at least one of the additional assist operating switch SW12 and the additional switch SW13 can be omitted from at least one of the operating switch devices 16, 216, 316, and 416. Similarly, the operating switch devices 26 includes the additional assist operating switch SW22 and the additional switch SW23. However, at least one of the additional assist operating switch SW12 and the additional switch SW13 can be omitted from the operating switch devices 26. The same modification can apply to the second to fourth embodiments and the above modifications.

In the above embodiments and the above modifications, the operating switch device 16 comprises the informing unit 16N. However, the informing unit 16N can be omitted from the operating switch device 16. The same modification can apply to the operating switch device 26, the second to fourth embodiments, and the above modifications.

In the first embodiment, the operating switch device 16 includes the wireless communicator WC12. In the second embodiment, the operating switch device 216 includes the PLC controller PC12. However, the operating switch device 16 or 216 can include the wireless communicator WC12 and the PLC controller PC12. The same modification can apply to the operating switch device 26, and the third and fourth embodiments and the modifications.

In the above embodiments and the above modifications, the assist operating switch SW11 is configured to receive the user operation input U11 to increase the assist driving force of the assist driving unit DU. The additional assist operating switch SW12 is configured to receive the additional user operation input U12 to decrease the assist driving force of the assist driving unit DU. The assist operating switch SW21 is configured to receive the user operation input U21 to increase the assist driving force of the assist driving unit DU. The additional assist operating switch SW22 is configured to receive the additional user operation input U22 to decrease the assist driving force of the assist driving unit DU. However, the assist operating switch SW11 can be used as other switches such as a power switch or a display control switch for the assist driving unit DU. The same modification can apply to the additional assist operating switch SW12, the assist operating switch SW21, and the additional assist operating switch SW22.

In the above embodiments and the above modifications, each of the operating devices 14, 214, 314, and 414 includes the first electrical switch SW14, the second electrical switch SW15, the communicator 14K, and the electric power source 14E. However, each of the operating devices 14, 214, 314, and 414 can include other structures to operate the gear changing device GC. For example, each of the operating devices 14, 214, 314, and 414 can include a wire take-up device configured to operate the gear changing device GC with an operation cable such as Bowden cable. In such modifications, the operating member 14B can be coupled to the wire take-up device to operate the gear changing device GC with the operation cable. The same modification can apply to each of the operating devices 16, 216, 316, and 416 of the first to fourth embodiments and the operating devices 24 and 26 of the first to fourth embodiments.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have," "include" and their derivatives.

The terms "member," "section," "portion," "part," "element," "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element," and the term "second element" itself does not imply an existence of "first element."

The term "pair of," as used herein, can encompass the configuration in which the pair of elements have different shapes or structures from each other in addition to the configuration in which the pair of elements have the same shapes or structures as each other.

The terms "a" (or "an"), "one or more" and "at least one" can be used interchangeably herein.

The phrase "at least one of" as used in this disclosure means "one or more" of a desired choice. For one example, the phrase "at least one of" as used in this disclosure means "only one single choice" or "both of two choices" if the number of its choices is two. For other example, the phrase "at least one of" as used in this disclosure means "only one single choice" or "any combination of equal to or more than two choices" if the number of its choices is equal to or more than three. For instance, the phrase "at least one of A and B" encompasses (1) A alone, (2), B alone, and (3) both A and B. The phrase "at least one of A, B, and C" encompasses (1) A alone, (2), B alone, (3) C alone, (4) both A and B, (5) both B and C, (6) both A and C, and (7) all A, B, and C. In other words, the phrase "at least one of A and B" does not mean "at least one of A and at least one of B" in this disclosure.

Finally, terms of degree such as "substantially," "about" and "approximately" as used herein mean a reasonable amount of deviation of the modified term such that the end result is not significantly changed. All of numerical values described in the present application can be construed as including the terms such as "substantially," "about" and "approximately."

Obviously, numerous modifications and variations of the present invention are possible in light of the above teachings. It is therefore to be understood that within the scope of the appended claims, the invention may be practiced otherwise than as specifically described herein.

What is claimed is:

1. An operating switch device for a human-powered vehicle, comprising:
    an assist operating switch configured to receive a user operation input to operate an assist driving unit configured to assist a human power, the assist driving unit including an assist motor to impart propulsion to the human-powered vehicle; and
    a coupling structure configured to detachably couple the assist operating switch to a base member of an operating device configured to be mounted to a handlebar, the base member including a base body including a grip portion provided between a coupling end configured to be coupled to the handlebar and a free end opposite to the coupling end, wherein
    the coupling structure includes an intermediate part configured to be provided between the base member and the handlebar in a state where the base member is mounted to the handlebar, the intermediate part is configured to be in direct contact with the handlebar.

2. The operating switch device according to claim 1, wherein
    the coupling structure is configured to detachably couple the assist operating switch to the base member of the operating device without coupling the assist operating switch directly to the handlebar.

3. The operating switch device according to claim 1, wherein
    the coupling structure includes a fastener configured to detachably couple the operating switch to the base member, and
    the fastener is configured to detachably couple the assist operating switch to at least one of the base body and a mounting clamp of the base member, the mounting clamp being configured to couple the base body to the handlebar.

4. The operating switch device according to claim 1, wherein
    the intermediate part is configured to be provided between the handlebar and at least one of the base body and a mounting clamp of the base member, the mounting clamp being configured to couple the base body to the handlebar.

5. An operating switch device for a human-powered vehicle, comprising:
    an assist operating switch configured to receive a user operation input to operate an assist driving unit configured to assist a human power; and
    a coupling structure configured to detachably couple the assist operating switch to a base member of an operating device configured to be mounted to a handlebar, the base member including a base body including a grip portion provided between a coupling end configured to be coupled to the handlebar and a free end opposite to the coupling end, wherein the coupling structure is configured to detachably couple the assist operating switch directly to a mounting clamp of the base member, the mounting clamp being configured to couple the base body to the handlebar.

6. The operating switch device according to claim 5, wherein
the coupling structure includes a fastener configured to detachably couple the assist operating switch to the mounting clamp.

7. The operating switch device according to claim 5, further comprising
an additional assist operating switch configured to receive an additional user operation input to operate the assist driving unit, wherein
the coupling structure is configured to detachably couple the assist operating switch and the additional assist operating switch to the base member.

8. The operating switch device according to claim 7, further comprising
an additional switch configured to receive an additional user input, wherein
the coupling structure is configured to detachably couple the assist operating switch, the additional assist operating switch, and the additional switch to the base member.

9. The operating switch device according to claim 5, further comprising
an informing unit configured to inform a user of information relating to the operating switch device, wherein
the coupling structure is configured to detachably couple the assist operating switch and the informing unit to the base member.

10. The operating switch device according to claim 5, further comprising
a switch base member coupled to the coupling structure, wherein
the assist operating switch is mounted to the switch base member.

11. The operating switch device according to claim 5, further comprising
a communication port configured to be connected to an electric cable, wherein
the coupling structure is configured to detachably couple the assist operating switch and the communication port to the base member.

12. The operating switch device according to claim 5, further comprising
a wireless communicator configured to wirelessly transmit an assist control signal in response to the user operation input, wherein
the coupling structure is configured to detachably couple the assist operating switch and the wireless communicator to the base member.

13. The operating switch device according to claim 5, wherein
the coupling structure includes a first connector configured to be electrically connected to a second connector of the base member, and
the first connector is configured to detachably couple the assist operating switch to the second connector.

14. An operating apparatus for a human-powered vehicle, comprising:
the operating switch device according to claim 5; and
the operating device including
the base member configured to be mounted to the handlebar, and
an operating member movably coupled to the base member,
the base member including a base body and a mounting clamp configured to couple the base body to the handlebar,
the base body including
a coupling end configured to be coupled to the handlebar,
a free end opposite to the coupling end, and
a grip portion provided between the coupling end and the free end, and
the mounting clamp is secured to the coupling end, and
the coupling structure being configured to detachably couple the assist operating switch to at least one of the coupling, and the free end, and the mounting clamp.

15. The operating apparatus according to claim 14, wherein
the coupling structure of the operating switch device includes a fastener configured to detachably couple the assist operating switch to the base member,
the base member includes a threaded hole, and
the fastener is configured to be threadedly engaged in the threaded hole.

16. The operating apparatus according to claim 14, wherein
the coupling structure of the operating switch device includes one of a convex portion and a recess,
the base member includes the other of the convex portion and the recess, and
the convex portion is configured to be provided in the recess in a state where the coupling structure detachably couples the assist operating switch to the base member.

17. The operating apparatus according to claim 5, wherein
the coupling structure of the operating switch device includes an intermediate part configured to be provided between the base member and the handlebar in a state where the base member is mounted to the handlebar.

18. An operating switch device for a human-powered vehicle, comprising:
an assist operating switch configured to receive a user operation input to operate an assist driving unit configured to assist a human power; and
a coupling structure configured to detachably couple the assist operating switch to a base member of an operating device configured to be mounted to a handlebar, the base member including a base body including a grip portion provided between a coupling end configured to be coupled to the handlebar and a free end opposite to the coupling end, wherein
the coupling structure includes one of a convex portion and a recess which is configured to be detachably coupled to the other of the convex portion and the recess provided on the base member.

19. The operating switch device according to claim 18, wherein
the convex portion and the recess are configured to detachably couple the assist operating switch to at least one of the base body and a mounting clamp of the base member, the mounting clamp being configured to couple the base body to the handlebar.

* * * * *